United States Patent
Oba et al.

(10) Patent No.: US 8,754,850 B2
(45) Date of Patent: Jun. 17, 2014

(54) APPARATUS, SYSTEM, METHOD, AND PROGRAM FOR PROCESSING INFORMATION

(71) Applicant: Sony Corporation, Tokyo (JP)

(72) Inventors: Haruo Oba, Kanagawa (JP); Atsushi Koshiyama, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/748,915

(22) Filed: Jan. 24, 2013

(65) Prior Publication Data

US 2013/0135252 A1 May 30, 2013

Related U.S. Application Data

(63) Continuation of application No. 12/587,449, filed on Oct. 7, 2009, now Pat. No. 8,378,966.

(30) Foreign Application Priority Data

Oct. 10, 2008 (JP) ................................ P2008-264222

(51) Int. Cl.
  *G09G 5/00* (2006.01)
(52) U.S. Cl.
  USPC ........... 345/156; 345/157; 345/173; 345/174; 715/757; 715/765; 715/782; 715/863; 359/1; 178/18.05; 178/18.06; 178/18.07
(58) Field of Classification Search
  USPC ................. 345/173, 174, 419–421, 156–158; 715/765, 782, 863, 757; 359/1, 2, 9; 348/51
  See application file for complete search history.

(56) References Cited

U.S. PATENT DOCUMENTS

| | | | |
|---|---|---|---|
| 6,211,848 B1 * | 4/2001 | Plesniak et al. | 345/156 |
| 2006/0082571 A1 | 4/2006 | McDaniel | |
| 2008/0059138 A1 * | 3/2008 | Tremblay et al. | 703/11 |
| 2008/0122798 A1 | 5/2008 | Koshiyama et al. | |
| 2008/0192026 A1 * | 8/2008 | MacKey et al. | 345/174 |
| 2008/0231611 A1 * | 9/2008 | Bathiche et al. | 345/175 |
| 2009/0058829 A1 * | 3/2009 | Kim et al. | 345/173 |
| 2009/0237367 A1 | 9/2009 | Ryu et al. | |

FOREIGN PATENT DOCUMENTS

| | | |
|---|---|---|
| JP | 2007-219676 A | 8/2007 |
| JP | 2008-117371 A | 5/2008 |

\* cited by examiner

*Primary Examiner* — Lun-Yi Lao
*Assistant Examiner* — Priyank Shah
(74) *Attorney, Agent, or Firm* — Lerner, David, Littenberg, Krumholz & Mentlik, LLP

(57) ABSTRACT

An information processing apparatus includes a sensor for generating a sensor output signal responsive to the three-dimensional coordinate position of a detection target in a monitor space by detecting a capacitance in the monitor space, and outputting the sensor output signal, a position detector for detecting the three-dimensional coordinate position of the detection target in the monitor space from the sensor output signal of the sensor, a storage unit for storing coordinate information identifying a three-dimensional space region set in the monitor space, a determining unit for determining whether the three-dimensional coordinate position of the detection target in the monitor space is contained in the three-dimensional set space region, based on the three-dimensional coordinate position of the detection target detected by the position detector and the coordinate information stored on the storage, and an output unit for outputting determination results of the determining unit.

8 Claims, 18 Drawing Sheets

FIG. 13

| SWITCH | DISTANCE (z COORDINATE) | REGION | | | |
|---|---|---|---|---|---|
| | | FIRST REGION (x0, y0) (x1, y1) | SECOND REGION (x1, y0) (x2, y1) | THIRD REGION (x0, y1) (x1, y2) | FOURTH REGION (x1, y1) (x2, y2) |
| SWITCH D | T4' | MEMORY ADDRESS OF LARGE BIRD SPECIES | MEMORY ADDRESS OF LARGE PLANT SPECIES | MEMORY ADDRESS OF LARGE FISH SPECIES | MEMORY ADDRESS OF LARGE BEAST SPECIES |
| SWITCH C | T3' | MEMORY ADDRESS OF MEDIUM BIRD SPECIES | MEMORY ADDRESS OF MEDIUM PLANT SPECIES | MEMORY ADDRESS OF MEDIUM FISH SPECIES | MEMORY ADDRESS OF MEDIUM BEAST SPECIES |
| SWITCH B | T2' | MEMORY ADDRESS OF SMALL BIRD SPECIES | MEMORY ADDRESS OF SMALL PLANT SPECIES | MEMORY ADDRESS OF SMALL FISH SPECIES | MEMORY ADDRESS OF SMALL BEAST SPECIES |
| SWITCH A | T1' | MEMORY ADDRESS OF VERY SMALL BIRD SPECIES | MEMORY ADDRESS OF VERY SMALL PLANT SPECIES | MEMORY ADDRESS OF VERY SMALL FISH SPECIES | MEMORY ADDRESS OF VERY SMALL BEAST SPECIES |

FIG. 20

| ALLOCATION | DISTANCE | REGION | | | |
|---|---|---|---|---|---|
| | | FIRST REGION (x0, y0) (x1, y1) | SECOND REGION (x1, y0) (x2, y1) | THIRD REGION (x0, y1) (x1, y2) | FOURTH REGION (x1, y1) (x2, y2) |
| TOUCH SWITCH | T4' | | | | |
| LAYER D | T4 − T3 | MEMORY ADDRESS OF LARGE BIRD SPECIES | MEMORY ADDRESS OF LARGE PLANT SPECIES | MEMORY ADDRESS OF LARGE FISH SPECIES | MEMORY ADDRESS OF LARGE BEAST SPECIES |
| LAYER C | T3 − T2 | MEMORY ADDRESS OF MEDIUM BIRD SPECIES | MEMORY ADDRESS OF MEDIUM PLANT SPECIES | MEMORY ADDRESS OF MEDIUM FISH SPECIES | MEMORY ADDRESS OF MEDIUM BEAST SPECIES |
| LAYER B | T2 − T1 | MEMORY ADDRESS OF SMALL BIRD SPECIES | MEMORY ADDRESS OF SMALL PLANT SPECIES | MEMORY ADDRESS OF SMALL FISH SPECIES | MEMORY ADDRESS OF SMALL BEAST SPECIES |
| LAYER A | T1 − 0 | MEMORY ADDRESS OF VERY SMALL BIRD SPECIES | MEMORY ADDRESS OF VERY SMALL PLANT SPECIES | MEMORY ADDRESS OF VERY SMALL FISH SPECIES | MEMORY ADDRESS OF VERY SMALL BEAST SPECIES |

APPARATUS, SYSTEM, METHOD, AND PROGRAM FOR PROCESSING INFORMATION

CROSS-REFERENCE TO RELATED APPLICATIONS

The present application is a continuation of U.S. patent application Ser. No. 12/587,449 filed on Oct. 7, 2009, which claims priority from Japanese Patent Application No. JP P2008-264222, filed on Oct. 10, 2008, in the Japanese Patent Office, the disclosures of which are hereby incorporated by reference herein.

BACKGROUND OF THE INVENTION

1. Field of the Invention

The present invention relates to an apparatus, system, method and program for processing information and, in particular, an apparatus, system, method and program for detecting a touch or the like on a real or virtual object using positional information of a detection target in space such as a human hand or finger to be detected by contactless type sensor means.

2. Description of the Related Art

An operation button or touchpanel may be typically used for a human operator to enter an operational input. The touchpanel is combined with a flat display such as a liquid-crystal display (LCD), and an operator presses a button icon displayed on a display screen to perform an input operation.

The input operation is performed based on a touch or a pressure applied on a flat surface of an operation button top or a touchpanel screen. An operation limited to touching or pressing serves as an input operation. The application of the input operation is limited to an area where touching on the flat surface is permitted.

Vibration or force caused by touch or pressure can degrade the performance of apparatuses, and blemish or damage the contact surface of the screen.

Japanese Unexamined Patent Application Publication No. 2008-117371 assigned to the same assignee of this invention discloses a proximity detection information display apparatus. In accordance with the disclosure, sensor means including a sensor panel having a plurality of line electrodes or dot electrodes arranged in two mutually perpendicular directions is used.

The sensor means detects a distance of a detection target to the surface of the sensor panel containing the plurality of electrodes, by detecting a capacitance responsive to the distance with respect to the plurality of electrodes. The detection target may be a human hand or finger and spaced apart from the surface of the sensor panel.

A capacitance between each of the plurality of electrodes on the sensor panel and the ground point varies depending on the position of the human hand or the human finger and the spatial distance of the human hand or the human finger to the panel surface. A threshold value is set in the human finger position and the spatial distance of the human finger to the panel surface, and a change in the capacitance responsive to the distance is detected in order to determine whether the finger gets closer than or farther apart than the threshold value.

Japanese Unexamined Patent Application Publication No. 2008-117371 discloses a technique that increases the detection sensitivity of capacitance by changing the spacing between the capacitance detecting electrodes depending on the distance between the detection target and the sensor panel.

The disclosed technique allows an operator to enter a switching input without touching the sensor panel. Since the sensor panel includes the plurality of line electrodes or dot electrodes in the mutually perpendicular directions, the disclosed technique allows the movement of the hand or finger in parallel with the plane of the panel surface to be detected. The input operation responsive to the movement of the hand or finger within space is performed.

SUMMARY OF THE INVENTION

A touch sensor is typically glued onto the surface of a three-dimensional (3D) object in order to detect the touching of a human hand or finger on the surface of the 3D object having any shape.

In order to detect touching anywhere on the surface of the 3D object, touch sensors are glued onto the entire surface of the 3D object, and the structure of the system become complex. A lead electrode is routed from the touch sensor, and connected to a detector device.

If the target 3D objects are valuables or precious metals, it is difficult to glue the touch sensor on the surface thereof.

If the technique disclosed in Japanese Unexamined Patent Application Publication No. 2008-117371 is used, the spatial position of the detection target such as a human hand or finger can be detected. Japanese Unexamined Patent Application Publication No. 2008-117371 discloses the technique of adjusting the detection sensitivity in accordance with the distance of the detection target to the sensor panel, but does not disclose the technique of detecting a touch on the surface of a 3D object of any type.

It is thus desirable to detect a touch of a detection target on a 3D object having any shape using a capacitance detection type contactless sensor disclosed in Japanese Unexamined Patent Application Publication No. 2008-117371.

According to one embodiment of the present invention, an information processing apparatus includes sensor means for generating a sensor output signal responsive to the three-dimensional coordinate position of a detection target in a monitor space by detecting a capacitance in the monitor space, and outputting the sensor output signal, position detector means for detecting the three-dimensional coordinate position of the detection target in the monitor space from the sensor output signal of the sensor means, storage means for storing coordinate information identifying a three-dimensional space region set in the monitor space, determining means for determining whether the three-dimensional coordinate position of the detection target in the monitor space is contained in the three-dimensional set space region, based on the three-dimensional coordinate position of the detection target detected by the position detector means and the coordinate information stored on the storage means, and output means for outputting determination results of the determining means.

In the information processing apparatus, the storage means stores the coordinate information identifying the three-dimensional space region that is set in the monitor space in response to the three-dimensional object placed in the monitor space. The sensor means detects the detection target from the monitor space.

The position detector means detects the three-dimensional coordinate position of the detection target, such as the hand or finger of an operator, in the monitor space from the sensor output signal of the sensor means.

The determining means determines whether the three-dimensional coordinate position of the detection target in the monitor space detected by the position detector means is contained in the three-dimensional set space region, and the output means outputs the determination results of the determining means.

From the determination results of the determining means output from the output means, the information processing apparatus can determine whether the human hand or finger has touched the 3D object placed in the monitor space.

The sensor means detects a capacitance, and can detect a real 3D object present in the 3D space region set in the monitor space.

It is not necessary that a real 3D object be present in the 3D space region set in the monitor space. For example, a 3D image projected by projector means may be present in the 3D space region set in the monitor space.

According to embodiments of the present invention, the information processing apparatus detects the touching of the detection target, such as the human hand or finger, on the 3D object or 3D image placed in the monitor space of the sensor means without using a touch sensor. If is sufficient if the 3D space region corresponding to space occupied by a 3D object or 3D image is set in the monitor space of the sensor means and is then stored.

BRIEF DESCRIPTION OF THE DRAWINGS

FIG. 13 illustrates the information processing apparatus of the third embodiment of the present invention;

FIG. 20 illustrates the information processing apparatus of the fourth embodiment of the present invention;

DESCRIPTION OF THE PREFERRED EMBODIMENTS

The embodiments of the present invention are described below with reference to the drawings. In the discussion of the embodiments that follows, a sensor detecting a three-dimensional (3D) coordinate position in a monitor space by detecting capacitance disclosed in Japanese Unexamined Patent Application Publication No. 2008-117371 is used. A detection target is typically a hand or a finger of a human operator.

First Embodiment

In accordance with a first embodiment of the present invention, an information processing apparatus detects whether a human hand or finger as a detection target has touched a three-dimensional (3D) object having any shape and placed in a monitor space of sensor means, and performs an alerting operation by emitting light or a sound if the information processing apparatus has detected the touching.

Figure 1:
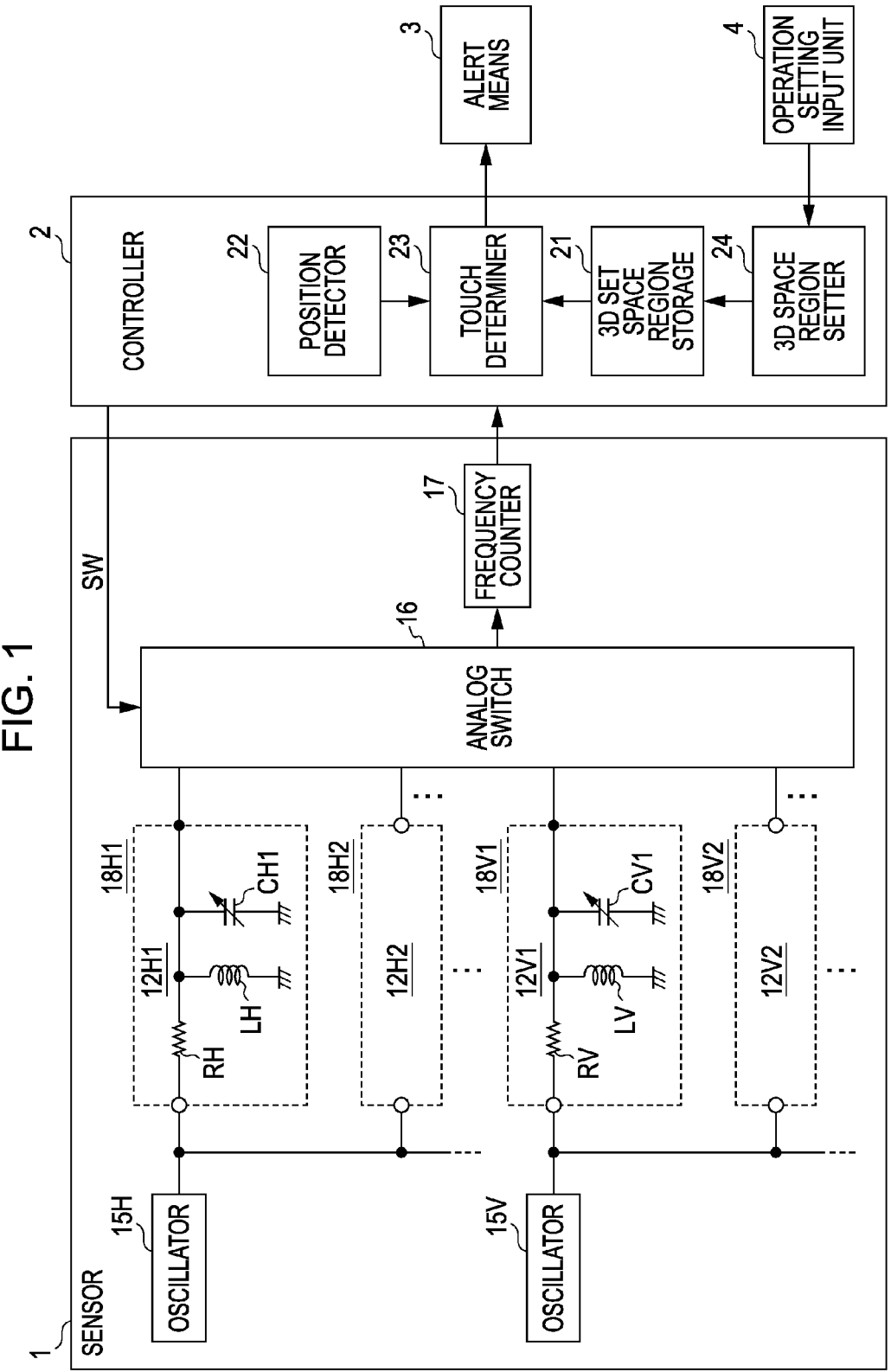
FIG. 1 is a block diagram illustrating a hardware structure of an information processing apparatus in accordance with a first embodiment of present invention.

FIG. 1 is a block diagram generally illustrating the information processing apparatus of the first embodiment. The information processing apparatus of the first embodiment includes a sensor 1, a controller 2, alert means 3, and an operation setting input unit 4.

The sensor 1 supplies the controller 2 with a sensor output responsive to a 3D coordinate position in the monitor space of the detection target. As will be described later, the sensor 1 includes a rectangular sensor panel having a predetermined two-dimensional size. A space over the sensor panel serves as the monitor space. The sensor 1 detects the 3D coordinate position of the detection target in the monitor space, and outputs to the controller 2 the sensor output responsive to the detected 3D coordinate position.

In accordance with the first embodiment, the sensor 1 detects individually vertical distances (z coordinates) of a detection target at a plurality of (x,y) coordinates in a horizontal direction and a vertical direction on the sensor panel, and outputs the detected coordinates as a detection output. The information processing apparatus of the first embodiment can thus detect the position over which the detection target is present.

For example, let the x axis represent the horizontal direction of the sensor panel plane, the y axis represent the vertical direction of the sensor panel plane, and the z axis represent a direction perpendicular to the sensor panel plane, and a spatial distance of the detection target is detected as a z coordinate value. The spatial position of the detection target on the sensor panel is detected in the x and y coordinates.

The controller 2 includes a microcomputer in the first embodiment. The controller 2 includes a 3D set space region storage 21, a position detector 22, a touch determiner 23, and a 3D space region setter 24.

The position detector 22, the touch determiner 23, and the 3D space region setter 24 are implemented as a software process of a program executed by the microcomputer in the first embodiment of the present invention. Optionally, the position detector 22, the touch determiner 23, and the 3D space region setter 24 may be implemented using hardware.

In response to the sensor output from the sensor 1, the position detector 22 in the controller 2 detects a spatial distance (z coordinate) of the detection target from the sensor panel plane. The position detector 22 also detects where the detection target is positioned on the sensor panel (i.e., in x and y coordinates). More specifically, the position detector 22 detects the three-dimensional (3D) coordinates of the detection target in the monitor space from the sensor output of the sensor 1.

The controller 2 pre-stores on the 3D set space region storage 21 coordinate information identifying the 3D set space region representing a region occupied by a 3D object. The 3D object is used to detect the touching of a human hand or finger.

In accordance with the first embodiment, the 3D space region setter 24 stores the coordinate information of the 3D set space region onto the 3D set space region storage in response to an operation performed on the operation setting input unit 4. The input operation of the coordinate information of the 3D set space region will be described in detail later.

The touch determiner 23 in the controller 2 determines whether the 3D coordinates of the detection target in the monitor space detected from the sensor output of the sensor 1 by the position detector 22 are contained in the 3D set space region stored on the 3D set space region storage 21.

If the 3D coordinates of the detection target in the monitor space are contained in the 3D set space region, the touch determiner 23 determines that the detection target is present within the 3D set space region. Moreover, if the 3D coordinates of the detection target in the monitor space are contained in the border of the 3D set space region, the touch determiner 23 also determines that the detection target is present within the 3D set space region.

If the touch determiner 23 determines that the 3D coordinates of the detection target in the monitor space are contained in the 3D set space region, the touch determiner 23 also determines that the detection target such as a human hand or finger has touched the 3D object having any shape and placed within the monitor space of the sensor 1.

If the touch determiner 23 determines that the detection target such as a human hand or finger has touched the 3D object having any shape and placed within the monitor space of the sensor 1, the alert means 3 alerts a person to the touching by emitting a buzzer sound or a message sound such as "Don't touch." The alert means 3 may also alert the person to the hand or finger touching by using light means, such as flashing a lamp, instead of or in addition to the sound alert and message alert.

Description of Sensor 1

In accordance with the first embodiment, a capacitance responsive to the distance between the plane of a sensor panel 10 and the detection target is detected by converting the capacitance into an oscillation frequency of an oscillator circuit in the same fashion as disclosed in Japanese Unexamined Patent Application Publication No. 2008-117371. The sensor 1 in the first embodiment counts pulses of a pulse signal responsive to the oscillation frequency, and outputs as a sensor output signal a count value responsive to the oscillation frequency.

Figure 2:
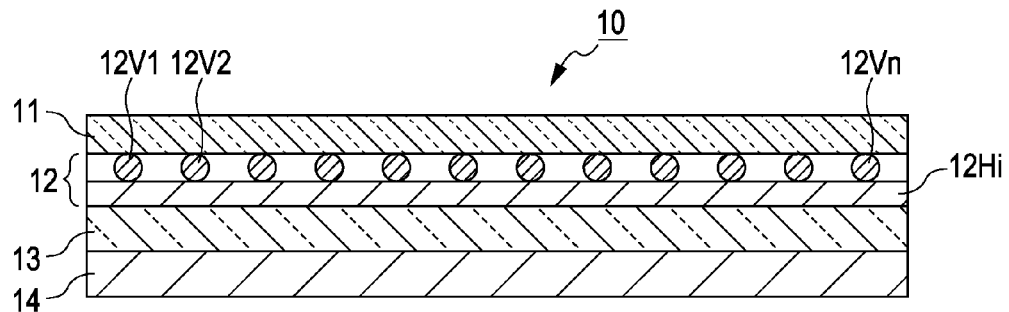
FIG. 2 illustrates sensor means used in the information processing apparatus in accordance with the first embodiment of the present invention.
Figure 3:
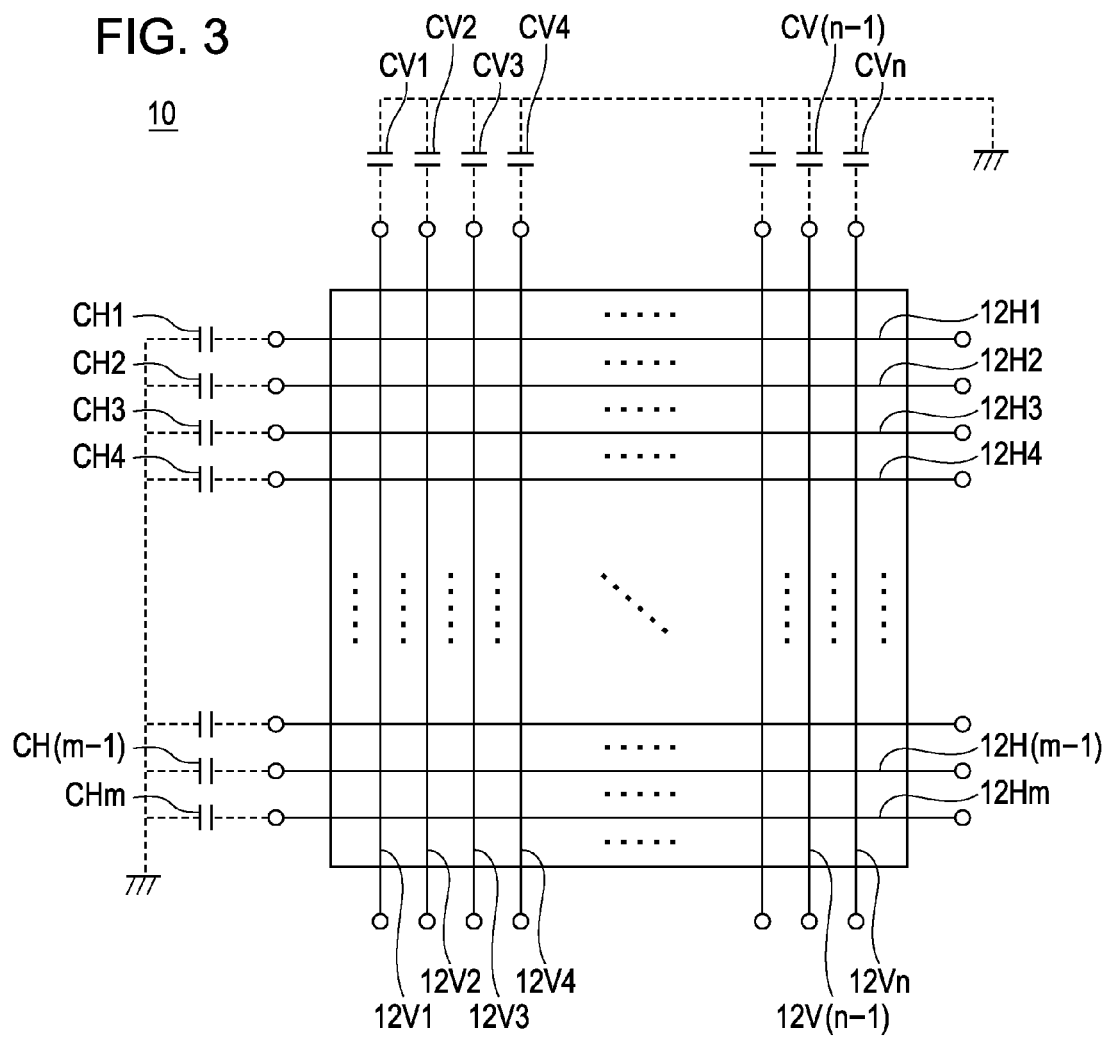
FIG. 3 illustrates the sensor means used in the information processing apparatus in accordance with the first embodiment of the present invention.

FIG. 1 illustrates a circuit arrangement of the internal structure of the sensor 1 for generating the sensor output signal in accordance with the first embodiment of the present invention. FIGS. 2 and 3 illustrate the sensor panel of the sensor 1 of the first embodiment of the present invention. FIG. 2 is a sectional view of the sensor panel 10.

Referring to FIG. 2, the sensor panel 10 includes an electrode layer 12 sandwiched between two glass sheets 11 and 13. The sandwich structure composed of the two glass sheets and 13 and the electrode layer 12 is bonded onto a substrate 14.

FIG. 3 is a plan view of the sensor panel 10 viewed from the side of the glass sheet 11 with the glass sheet 11 removed. The monitor space of the sensor 1 for the detection target is a space present on and over a plane defined by the horizontal direction (in the x axis) and the vertical direction (in the Y axis) of the sensor panel 10.

In accordance with the first embodiment, a plurality of wire electrodes are arranged in mutually perpendicular directions on the electrode layer 12 as illustrated in FIGS. 2 and 3. More specifically, a plurality of horizontal electrodes 12H1, 12H2, 12H3, . . . , 12Hm (m being an integer equal to or greater than 2) having the wire electrode extension direction thereof aligned with the horizontal direction are arranged at regular intervals in a vertical direction as illustrated in FIG. 3.

Capacitances (stray capacitances) CH1, CH2, CH2, . . . , CHm are present between the plurality of horizontal electrodes 12H1, 12H2, 12H3, . . . , 12Hm and the ground, respectively. The stray capacitances CH1, CH2, CH2, . . . , CHm vary depending on the presence position of a human hand or finger in the space over the sensor panel 10.

One end and the other end of each of the plurality horizontal electrodes 12H1, 12H2, 12H3, . . . , 12Hm serve as electrode terminals. The ends of the plurality horizontal electrodes 12H1, 12H2, 12H3, . . . , 12Hm are respectively connected to an oscillator 15H for the horizontal electrodes, and the other ends of the plurality horizontal electrodes 12H1, 12H2, 12H3, . . . , 12Hm are respectively connected to an analog switch 16.

The horizontal electrodes 12H1, 12H2, 12H3, . . . , 12Hm are represented in equivalent circuit as illustrated in FIG. 1. FIG. 1 illustrates the equivalent circuit of only the horizontal electrode 12H1. The equivalent circuits of the remaining electrodes 12H2, 12H3, . . . , 12Hm are also the same as the equivalent circuit of the horizontal electrode 12H1 illustrated in FIG. 1.

The equivalent circuit of the horizontal electrode 12H1 includes a resistance RH, an inductance LH, and a capacitance CH1 as a detection target. In the equivalent circuits of the remaining electrodes 12H2, 12H3, . . . , 12Hm, the capacitances are respectively CH2, CH3, . . . , CHm.

The equivalent circuit of each of the horizontal electrodes 12H1, 12H2, 12H3, . . . , 12Hm forms a resonator circuit, and thus forms an oscillator circuit together with the oscillator 15H. The horizontal electrodes 12H1, 12H2, 12H3, . . . , 12Hm thus form horizontal electrode capacitance detector circuits 18H1, 18H2, 18H3, . . . , 18Hm, respectively. Outputs of the horizontal electrode capacitance detector circuits 18H1, 18H2, 18H3, . . . , 18Hm become signals having respective oscillation frequencies responsive to the capacitances CH1, CH2, CH3, ..., CHm of the detection target depending on the distance of the detection target to the plane of the sensor panel 10.

If the user gets his or her hand or finger closer to or farther from the plane of the sensor panel 10, the capacitances CH1, CH2, CH3, ..., CHm vary. The horizontal electrode capacitance detector circuits 18H1, 18H2, 18H3, ..., 18Hm detect a change in the position of the hand or finger as a change in the oscillation frequency of the oscillator circuit.

A plurality of vertical electrodes 12V1, 12V2, 12V3, ..., 12Vn (n being an integer equal to or greater than 2) having the wire electrode extension direction thereof aligned with the vertical direction are arranged at regular intervals in a horizontal direction as illustrated in FIG. 3.

One end and the other end of each of the plurality vertical electrodes 12V1, 12V2, 12V3, ..., 12Vn serve as electrode terminals. The ends of the plurality vertical electrodes 12V1, 12V2, 12V3, ..., 12Vn are respectively connected to an oscillator 15V for the vertical electrodes. In the first embodiment, the basic frequency of the output signal of the oscillator 15V for the vertical electrodes is different from that of the oscillator 15H for the horizontal electrodes.

The other ends of the plurality vertical electrodes 12V1, 12V2, 12V3, ..., 12Vn are respectively connected to the analog switch 16.

A vertical electrode capacitance detector circuit 16V includes a signal source 161V, a DC bias source 162V, a switch circuit 163V, a two-electrode equivalent circuit 164V, and a frequency-voltage converter circuit (F-V converter circuit) 165V. The vertical electrode capacitance detector circuit 16V has the same structure as the horizontal electrode capacitance detector circuit 16H.

The vertical electrodes 12V1, 12V2, 12V3, ..., 12Vn are also represented in equivalent circuit in FIG. 1 as the horizontal electrodes. FIG. 1 illustrates the equivalent circuit of only the vertical electrode 12V1. The equivalent circuits of the remaining 12V2, 12V3, ..., 12Vn are also the same as the equivalent circuit of the vertical electrode 12V1 illustrated in FIG. 1.

The equivalent circuit of the vertical electrode 12V1 includes a resistance RV, an inductance LV, and a capacitance CV1 as a detection target. The remaining vertical electrodes 12V2, 12V3, ..., 12Vn respectively include the capacitances CV2, CV3, ..., CVn.

The equivalent circuit of each of the vertical electrodes 12V1, 12V2, 12V3, ..., 12Vn as a resonator circuit forms an oscillator circuit with the oscillator 15V. The vertical electrodes 12V1, 12V2, 12V3, ..., 12Vn thus form vertical electrode capacitance detector circuits 18V1, 18V2, 18V3, ..., 18Vn, respectively. The outputs of the vertical electrode capacitance detector circuits 18V1, 18V2, 18V3, ..., 18Vn become signals having respective oscillation frequencies responsive to the capacitances CV1, CV2, CV3, ..., CVn of the detection target depending the distance of the detection target to the plane of the sensor panel 10.

The vertical electrode capacitance detector circuits 18V1, 18V2, 18V3, ..., 18Vn detect as a change in the oscillation frequencies of the oscillator circuits a change in the capacitances CV1, CV2, CV3, ..., CVn responsive to a change in the position of the hand or finger.

The outputs of the horizontal electrode capacitance detector circuits 18H1, 18H2, 18H3, ..., 18Hm and the outputs of the vertical electrode capacitance detector circuits 18V1, 18V2, 18V3, ..., 18Vn are thus supplied to the analog switch 16.

In response to a switch signal from the controller 2, the analog switch 16 successively selects and outputs one of the outputs of the horizontal electrode capacitance detector circuits 18H1, 18H2, 18H3, ..., 18Hm and the outputs of the vertical electrode capacitance detector circuits 18V1, 18V2, 18V3, ..., 18Vn at a predetermined speed.

The output of the analog switch 16 is supplied to a frequency counter 17. The frequency counter 17 calculates the oscillation frequency of the input signal. More specifically, the input signal to the frequency counter 17 is a pulse signal at the oscillation frequency. If the frequency counter 17 calculates the pulse count of the pulse signal within a predetermined period of time, the resulting count corresponds to the oscillation frequency.

The count output value of the frequency counter 17 is supplied to the controller 2 as the sensor output of the wire electrode selected by the analog switch 16. The count output value of the frequency counter 17 is obtained in synchronization with the switch signal SW supplied from the controller 2 to the analog switch 16.

The controller 2 determines the wire electrode providing the sensor output corresponding to the count output value of the frequency counter 17, in response to the switch signal SW supplied to the analog switch 16. The controller 2 then stores on a buffer of the position detector 22 the count output value with the wire electrode mapped thereto.

The position detector 22 in the controller 2 detects a spatial position of the detection target (distance to the plane of the sensor panel 10 and the x and y coordinates on the plane of the sensor panel 10) from the sensor outputs of all wire electrodes detected and stored on the buffer.

As disclosed in Japanese Unexamined Patent Application Publication No. 2008-117371, the sensor outputs are obtained from the plurality of horizontal electrode capacitance detector circuits 18H1-18Hm and the vertical electrode capacitance circuits 18V1-18Vn in response to the x and y coordinates of the detection target on the plane of the sensor panel 10. The distance of the detection target, if measured vertically from a point of the detection target right above and corresponding to the x and y coordinates down to a point at the x and y coordinates on the plane of the sensor panel 10, is shortest. The sensor output from the horizontal electrode capacitance detector circuit and the vertical electrode capacitance detector circuit, detecting the capacitance between the two electrodes corresponding to these two points, becomes much more pronounced than the other outputs.

From this point of view, the position detector 22 in the controller 2 determines, from a plurality of sensor outputs from the sensor 1, x and y coordinates at which the detection target is positioned over the plane of the sensor panel 10 and the distance of the detection target to the sensor panel 10 (z coordinate). More specifically, the position detector 22 determines that the detection target, such as the position of the hand, is within the space right over the detected x and y coordinates. The detection target has a predetermined size, and is thus detected based on the premise that the detection target is spaced by the distance (z coordinate) responsive to the capacitance within the range of x and y coordinates on the sensor panel 10 corresponding to the size of the detection target.

In accordance with the first embodiment of the present invention, the wire electrodes detecting capacitance are switched in a decimation operation depending on the spatial distance to the plane of the sensor panel 10 in the same fashion as disclosed in Japanese Unexamined Patent Application Publication No. 2008-117371. In the decimation-switching operation of the wire electrodes, the analog switch 16 selects the wire electrodes every several lines (including zero line for selecting all the lines) in response to the switch signal SW from the controller 2. The switching timing of the wire electrodes may be predetermined in response to the distance of the detection target to the plane of the sensor panel 10, for example, in response to a change of layer to be discussed later.

The oscillator for the horizontal electrodes and the oscillator for the vertical electrodes are employed in the above discussion. Alternatively, a single oscillator may be shared by the horizontal and vertical electrodes in a simple design. Ideally, oscillators of different frequencies may be employed respectively for wire electrodes.

Setting of Coordinate Information Identifying the 3D Set Space Region

Figure 4:
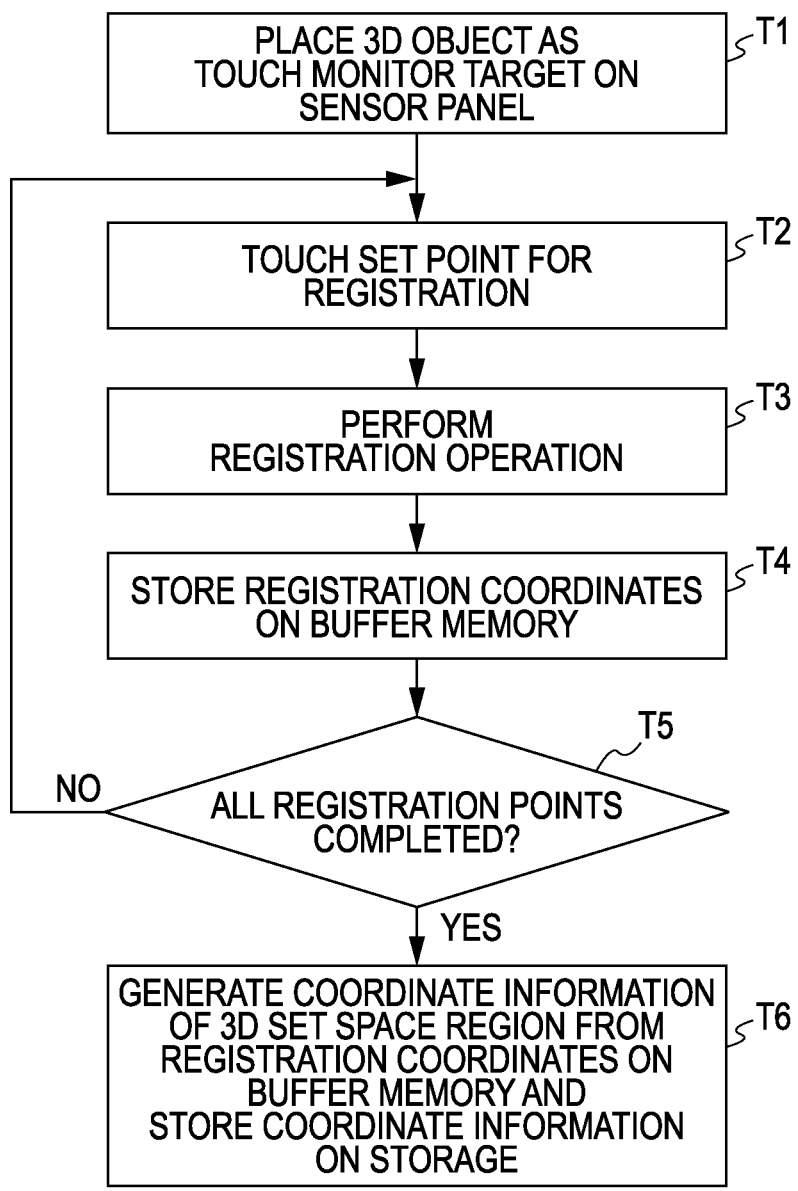
FIG. 4 illustrates a process of generating coordinate information of a 3D set space region of the information processing apparatus in accordance with the first embodiment of the present invention.

FIG. 4 is a flowchart illustrating a process of storing coordinate information identifying the 3D set space region onto the 3D set space region storage 21. A large number of points identifying the external surface of the 3D object as a target to monitor are successively set by an operator, and a region occupied by the target 3D object in the space is set and registered as the 3D set space region through an interpolation process performed on the coordinates of the set points.

Figure 5:
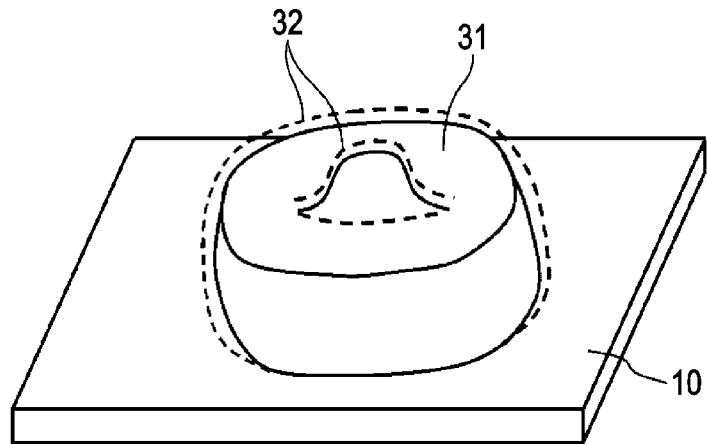
FIG. 5 illustrates the coordinate information of the 3D set space region of the information processing apparatus in accordance with the first embodiment of the present invention.

The operator places a 3D object 31 as a target to monitor on the plane of the sensor panel 10 (process step T1) as illustrated in FIG. 5.

The operator touches the external surface to be registered with his or her hand or finger (process step T2). If the operator is prohibited from touching directly the 3D object 31, the operator may wear gloves. Since the sensor 1 of the first embodiment detects position based on capacitance, the position of the hand or finger can still be detected by the operator wearing gloves. The 3D coordinates of the point touched by the operator are detected by the position detector 22.

The operator registers a registration operation on the operation setting input unit 4 with a registration point on the 3D object 31 touched by the hand or finger (process step T3). The operator simply presses a set button on the operation setting input unit 4 to perform the registration operation.

When the registration operation is performed by the operator, the 3D space region setter 24 in the controller 2 stores onto a buffer memory thereof the 3D coordinates of the point touched by the operator and detected by the position detector 22 (process step T4).

The operator determines whether the inputting of all the registration points has been completed (process step T5). If the operator determines that further inputting of registration points is to be performed, processing returns to process step T2. The operator touches a point on the external surface to be registered next with his or her hand. Above process steps T2 through T5 are cycled through.

If it is determined in process step T5 that the inputting of all the registration points has been completed, the operator performs a registration input ending operation of the registration points on the operation setting input unit 4 (process step T6). The operator simply presses a registration input end button on the operation setting input unit 4 to end the registration input operation.

In response to the operator's pressing the registration input end button, the 3D space region setter 24 in the controller 2 generates the coordinate information of the 3D set space region matching the shape of the 3D object 31 from the coordinates of the registration points stored on the internal buffer memory (process step T5). In process step T5, the 3D space region setter 24 determines a coordinate value between adjacent registration points through the interpolation process, thereby generating the coordinate information of the 3D set space region.

In this case, the coordinate value of the border of the 3D set space region may be a coordinate value immediately prior to the actual touching to the 3D object 31 (see the position of point of broken lines 32 as illustrated in FIG. 5). In this way, in the determination of the touching on the 3D object 31, the touch determiner 23 can perform a touching determination more reliably by comparison with the 3D coordinates of the detection target detected by the position detector 22. If the operator is prohibited from touching directly the 3D object 31, such an operation is even more advisable.

Process of the Controller 2

Figure 6:
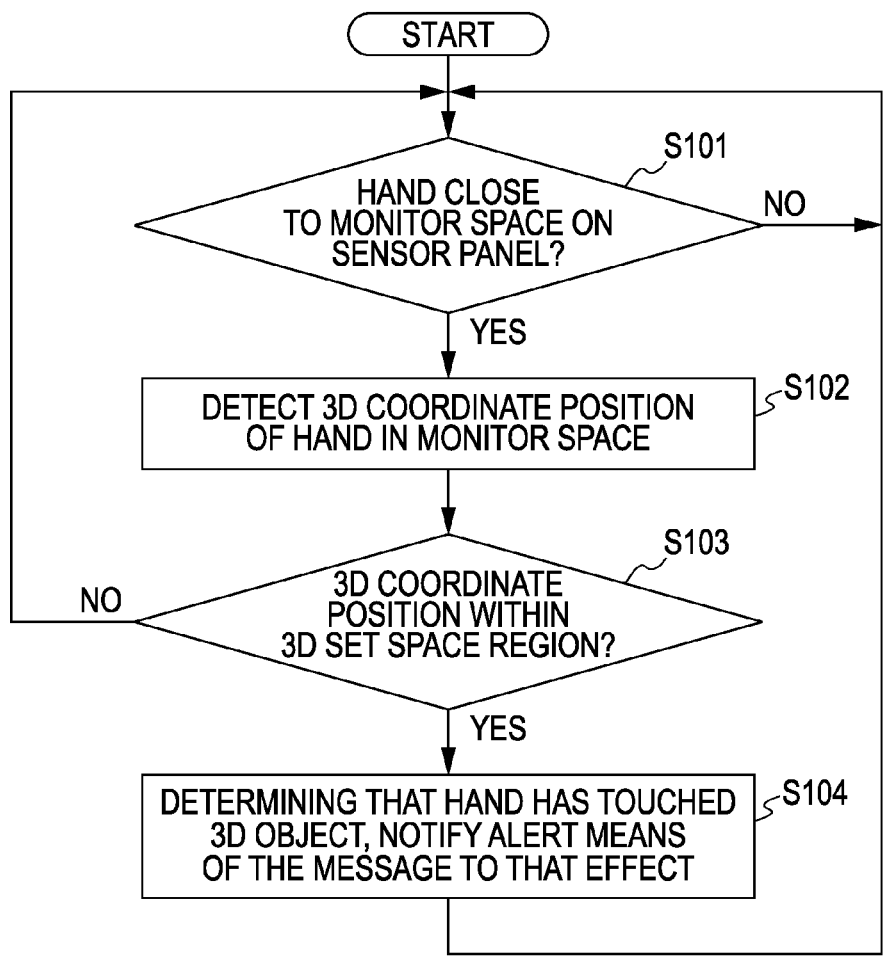
FIG. 6 is a flowchart illustrating a process of the information processing apparatus in accordance with the first embodiment of the present invention.

FIG. 6 is a flowchart of a process of the controller in accordance with the first embodiment of the present invention. The process represented by the flowchart of FIG. 6 corresponds to a process of the position detector 22 and the touch determiner 23, executed by a microcomputer.

The controller 2 monitors the sensor output from the sensor 1 and determines whether a hand or finger of an operator as a detection target is present in the monitor space over the sensor panel 10 (step S101). The controller 2 waits on standby until a hand or finger is detected.

Determining in step S101 that a hand or finger is detected in the monitor space, the controller 2 detects the 3D coordinate position of the hand or finger in the monitor space (step S102).

The controller 2 then compares the 3D coordinate position of the detected hand or finger with the coordinate information of the 3D set space region, thereby determining whether the position of the hand or finger is contained in the 3D set space region (step S103).

If the controller 2 determines in step S103 that the position of the hand or finger is not contained in the 3D set space region, the controller 2 returns to step S101 to repeat step S101 and subsequent steps. If the controller 2 determines in step S103 that the position of the hand or finger is contained in the 3D set space region, the controller 2 determines that the hand or finger has touched the 3D object and then so notifies the alert means 3 (step S104). The alert means 3 executes the previously described sound emission. The controller 2 returns to step S101 to repeats step S101 and subsequent steps.

In accordance with the first embodiment, the information processing apparatus detects the touching of the detection target on the 3D object placed on the sensor panel 10, and then so notifies the operator. The 3D object is simply placed on the sensor panel 10 and no particular operation is necessary for the sensor panel 10 for touch detection.

In the above discussion, the detection target is a human hand or finger. The detection target is not limited to a human hand or finger. Any detection target is acceptable as long as the detection target can be detected by the sensor 1 as a change in capacitance.

In the discussion of the first embodiment, the information processing apparatus determines whether the detection target has touched the 3D object. A space containing the 3D object and larger than the external surface of the 3D object by a predetermined thickness dimension may be set as the 3D set space region. In such a case, the detection target gets close to the space outside the external surface of the 3D object by the predetermined thickness dimension, the detection target is detected, and the notification is provided.

Second Embodiment

In accordance with the first embodiment of the present invention, the information processing apparatus includes the sensor 1. An information processing system of a second embodiment of the present invention includes a sensor and a controller as separate elements.

Figure 7:
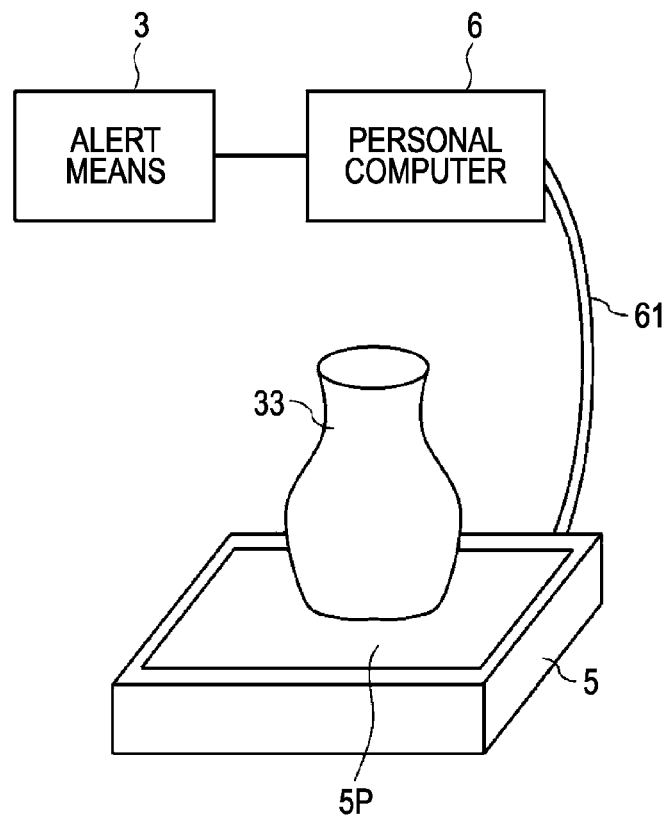
FIG. 7 is a block diagram illustrating a structure of an information processing system in accordance with a second embodiment of the present invention.

FIG. 7 is a block diagram illustrating the information processing system of the second embodiment of the present invention.

The information processing system of the second embodiment includes a sensor 5 identical in structure to the sensor 1, a personal computer 6 as an information processing apparatus corresponding to the controller 2 of the first embodiment, and alert means 3 for providing notification by means of sound and/or light. The sensor 5 is connected to the personal computer 6 via a connection cable 61. The alert means 3 is connected to the personal computer 6.

The sensor 5 includes a sensor panel 5P having the same structure as the sensor panel 10 of the sensor 1 of the first embodiment. A 3D object 33 for touch monitoring is placed on the sensor panel 5P. The sensor output of the sensor 5 is supplied to the personal computer 6.

The personal computer 6 includes the 3D set space region storage 21 of the controller 2 and has an application program installed thereon to execute the functions of each of the position detector 22, the touch determiner 23, and the 3D space region setter 24.

In the information processing system, the user simply prepares the sensor 5 and installs the application program on the personal computer 6. The information processing system detects the touching on the 3D object in the same manner as the information processing apparatus of the first embodiment.

Third Embodiment

The information processing apparatus of a third embodiment of the present invention determines the touching of a hand or finger of an operator on a 3D object, such as a rectangular parallelepiped, placed on a sensor panel, as a switch input, and executes a particular application program in response to the determination results.

In accordance with the third embodiment, a particular application is an electronic picture book. Pre-stored image information of animal or plant is read in response to the switch input, and then displayed on a display screen of a display.

Figure 8:
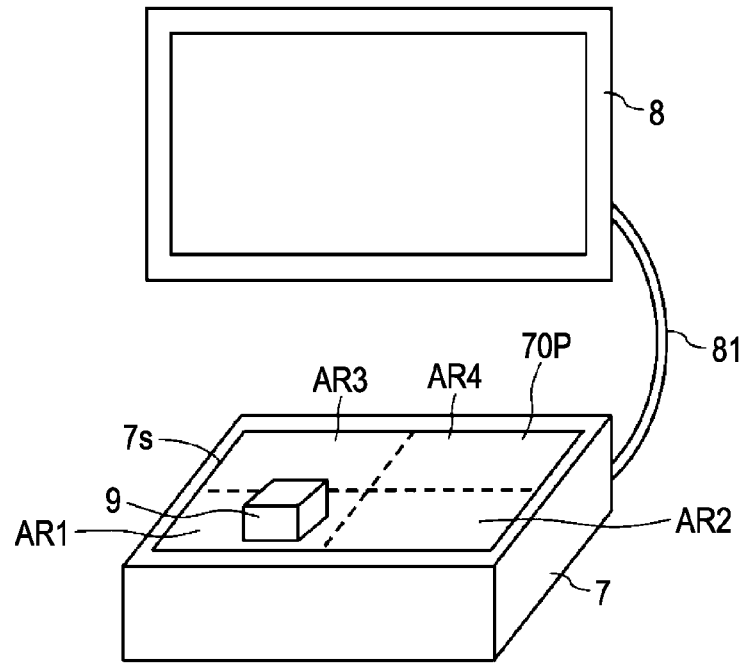
FIG. 8 illustrates a system structure of the information processing apparatus in accordance with a third embodiment of the present invention.

Referring to FIG. 8, an information processing apparatus 7 of the third embodiment is connected to a display 8 via a connection cable 81.

Figure 9:
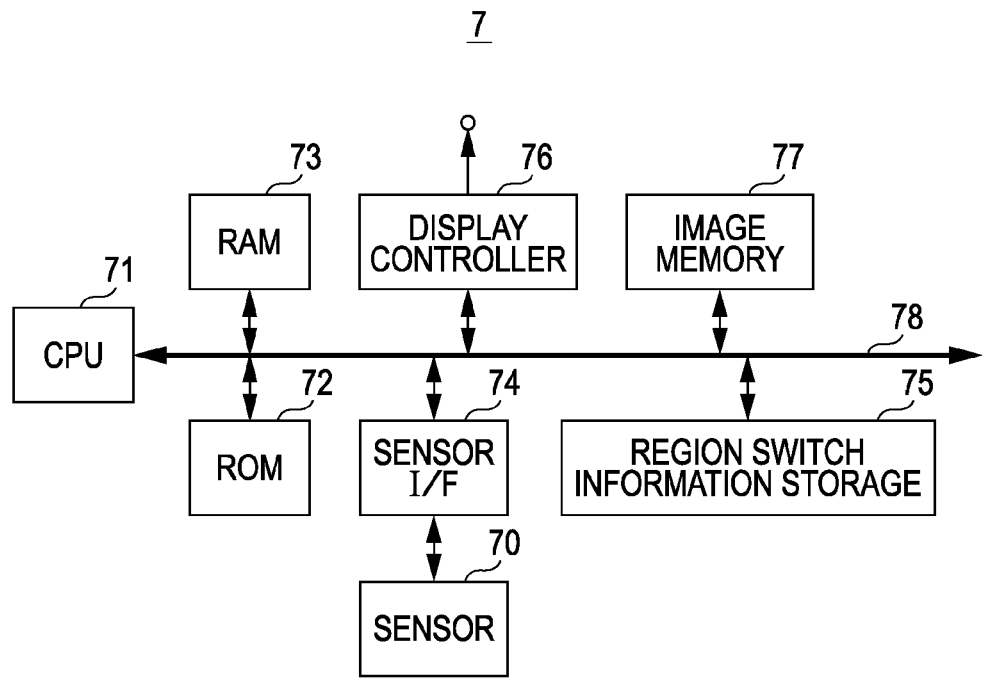
FIG. 9 is a block diagram illustrating a hardware structure of the information processing apparatus in accordance with the third embodiment of the present invention.

FIG. 9 illustrates a hardware structure of the information processing apparatus 7 of the third embodiment of the present invention. The information processing apparatus 7 of the third embodiment includes a microcomputer.

More specifically, the information processing apparatus 7 includes a central processing unit (CPU) 71, a read-only memory (ROM) 72 storing a program, and a random-access memory (RAM) 73 serving a working area, both connected to the CPU 71 via a system bus 78.

A sensor 70 is connected to the system bus 78 via a sensor interface (I/F) 74. The system bus 78 connects to a region switch information storage 75, a display controller 76, and an image memory 77.

The display controller 76 is connected to a display 8 and has the function of a display interface.

The image memory 77 stores image information of the electronic picture book, such as image information of bird species, plant species, fish species, and beast species, on different address regions. In this example, living things belonging to the same species are further sorted according to size, such as large, medium, small, and very small sizes, and stored in different address areas.

The sensor 70 has the same structure as the sensor 1 discussed with reference to the first embodiment. The information processing apparatus 7 includes the function of the controller 2 of the first embodiment in the form of a software process of the program stored on the ROM 72 and executed by the CPU 71.

Referring to FIG. 8, a surface 7S of the information processing apparatus 7 is a plane expanding in parallel with a glass surface of a sensor panel 70P of the sensor 70. A predetermined protective plate (not shown) covers the glass surface of the sensor panel 70P for protection.

Figure 10:
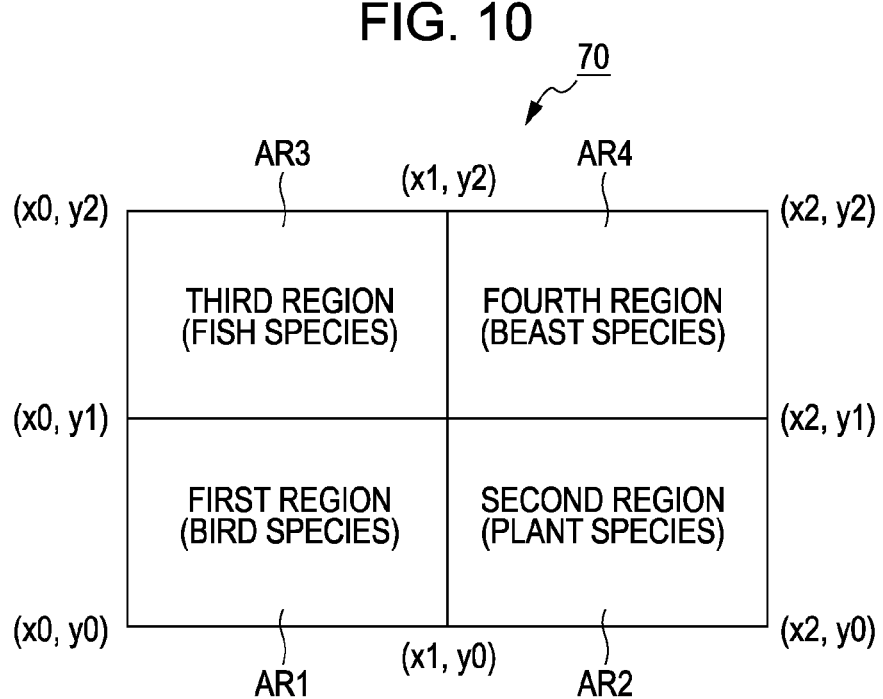
FIG. 10 illustrates the information processing apparatus of the third embodiment of the present invention.

In accordance with the second embodiment, the x and y coordinate area of the sensor panel 70P of the sensor 70 is partitioned into four regions, namely, a first region AR1, a second region AR2, a third region AR3, and a fourth region AR4 as illustrated in FIG. 10. The areas covered by the first through fourth regions AR1-AR4 are defined by (x,y) coordinates as illustrated in FIG. 10.

In accordance with the second embodiment, a block 9 is placed on the sensor panel 70P of the sensor 70 as an attachment to the information processing apparatus 7 in order to input a switch input. The block 9 is a rectangular parallelepiped, and may be an object that is hard and not elastic. For example, the block 9 is a wooden block.

In accordance with the second embodiment, the operator places the block 9 on the sensor panel 70P, and enters the switch input by touching the top surface of the block 9.

The region switch information storage 75 in the information processing apparatus 7 stores the coordinate information of the 3D set space region of the block 9 in order to detect the touching on the top surface of the block 9. In accordance with the second embodiment, information regarding the distance (z coordinate) from the sensor panel 70P, namely, the height of the block 9, is stored as the coordinate information of the 3D set space region of the block 9.

In accordance with the second embodiment, the 3D set space region of the block 9 is an entire space over the sensor panel 70P having a height shorter than the z coordinate value of the block 9. The distance (z coordinate value) to be stored is preferably slightly larger than the height of the block 9 so that the touch on the top surface of the block 9 is reliably detected.

Since the block 9 is placed on the sensor panel 70P, the position of the block 9 is known from the sensor output of the sensor panel 70P. In such a case, the 3D set space region of the block 9 is a space defined by the block 9 on the sensor panel 70P shorter than the z coordinate value of the block 9.

In the same manner as in the first embodiment, the CPU 71 in the information processing apparatus 7 detects the 3D coordinate position of a hand or finger of the operator from the sensor output from the sensor 70, and determines whether the detected position is contained in the 3D set space region of the block 9. If the CPU 71 determines that the detected 3D coordinate position is contained in the 3D set space region, the CPU 71 also determines that the top surface of the block 9 has been touched.

In accordance with the second embodiment of the present invention, the block 9 may be placed in the first region AR1, and if the top surface of the block 9 is touched, the image of the bird species is read from the image memory 77.

The block 9 may be placed in the second region AR2, and if the top surface of the block 9 is touched, the image of the plant species is read from the image memory 77.

The block 9 may be placed in the third region AR3, and if the top surface of the block 9 is touched, the image of the fish species is read from the image memory 77.

The block 9 may be placed in the fourth region AR4, and if the top surface of the block 9 is touched, the image of the beast species is read from the image memory 77.

A plurality of blocks 9 different in height may be prepared so that living things belonging to the same species but different in size may be read from the image memory 77. More specifically, a plurality of ranges from the sensor panel 70P to the hand or finger as the detection target are set, and different plants or animals are thus read from the image memory 77.

Figure 11:
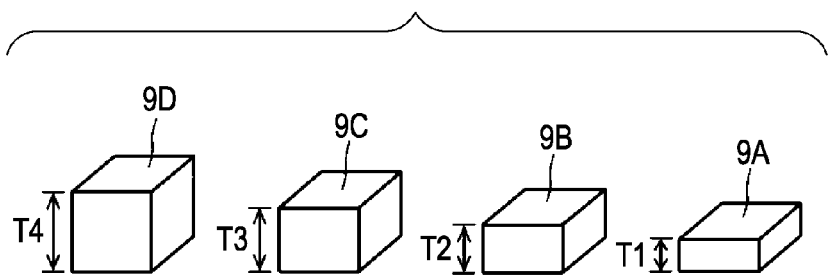
FIG. 11 illustrates the information processing apparatus of the third embodiment of the present invention.

In accordance with the second embodiment, four blocks 9 are prepared as illustrated in FIG. 11: a block 9A having a height T1, a block 9B having a height T2 (>T1), a block 9C having a height T3 (>T2), and a block 9D having a height T4 (>T3).

Switch A, switch B, switch C, and switch D are respectively defined for the blocks 9A, 9B, 9C, and 9D.

Figure 12:
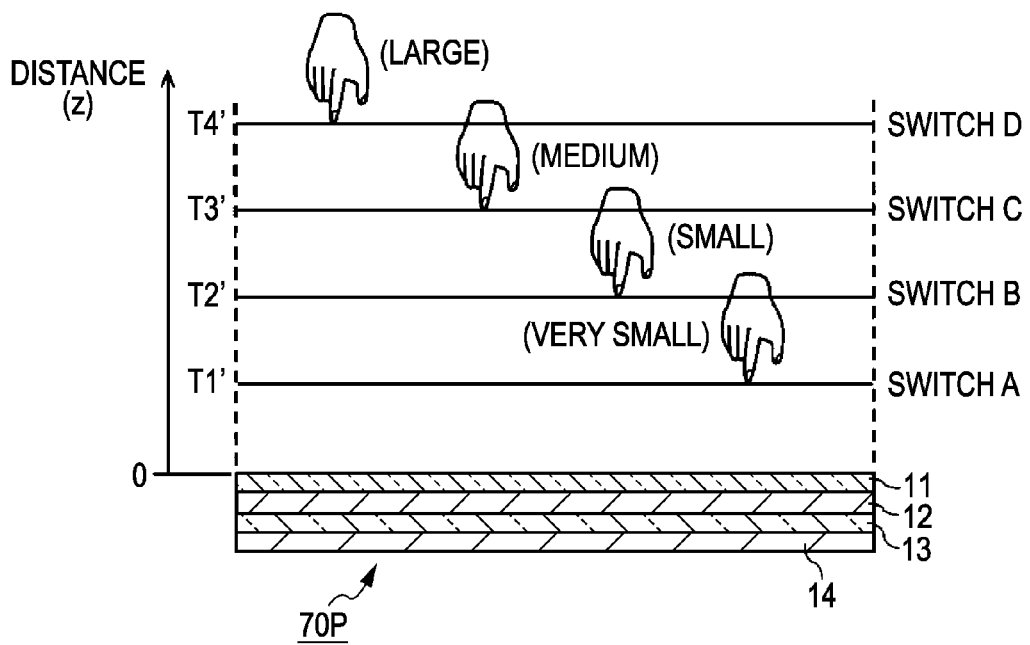
FIG. 12 illustrates the information processing apparatus of the third embodiment of the present invention.

Referring to FIG. 12, the switch A is switched on if the top surface of the block 9A having a height T1 is touched. The switch B is switched on if the top surface of the block 9B having a height T2 is touched. The switch C is switched on if the top surface of the block 9C having a height T3 is touched. The switch C is switched on if the top surface of the block 9C having a height T4 is touched.

Referring to FIG. 12, distances T1', T2', T3', and T4' are z coordinates for detecting switch-on, and are respectively slightly larger than heights T1, T2, T3, and T4.

In accordance with the second embodiment, switch-on states of the switches A, B, C, and D respectively refer to the very small, small, medium, and large sizes.

Information thus arranged is stored on the region switch information storage 75. FIG. 13 illustrates an example of region switch information stored on the region switch information storage 75. The region switch information is distances (z coordinates) T1', T2', T3', and T4', and is used to detect switch-on state of the switches A, B, C, and D, respectively.

Information determined by the four regions and the switch-on states of the switches A, B, C, and D is memory addresses of the image memory 77 at which image information of the bird species, plant species, fish species, and beast species of the large, medium, small, and very small sizes is stored.

Any of the four blocks is placed within one of the four regions and the operator performs a switching operation. The CPU 71 references the region switch information storage 75, thereby reading an image in response to the switching operation performed by the operator.

Figure 14:
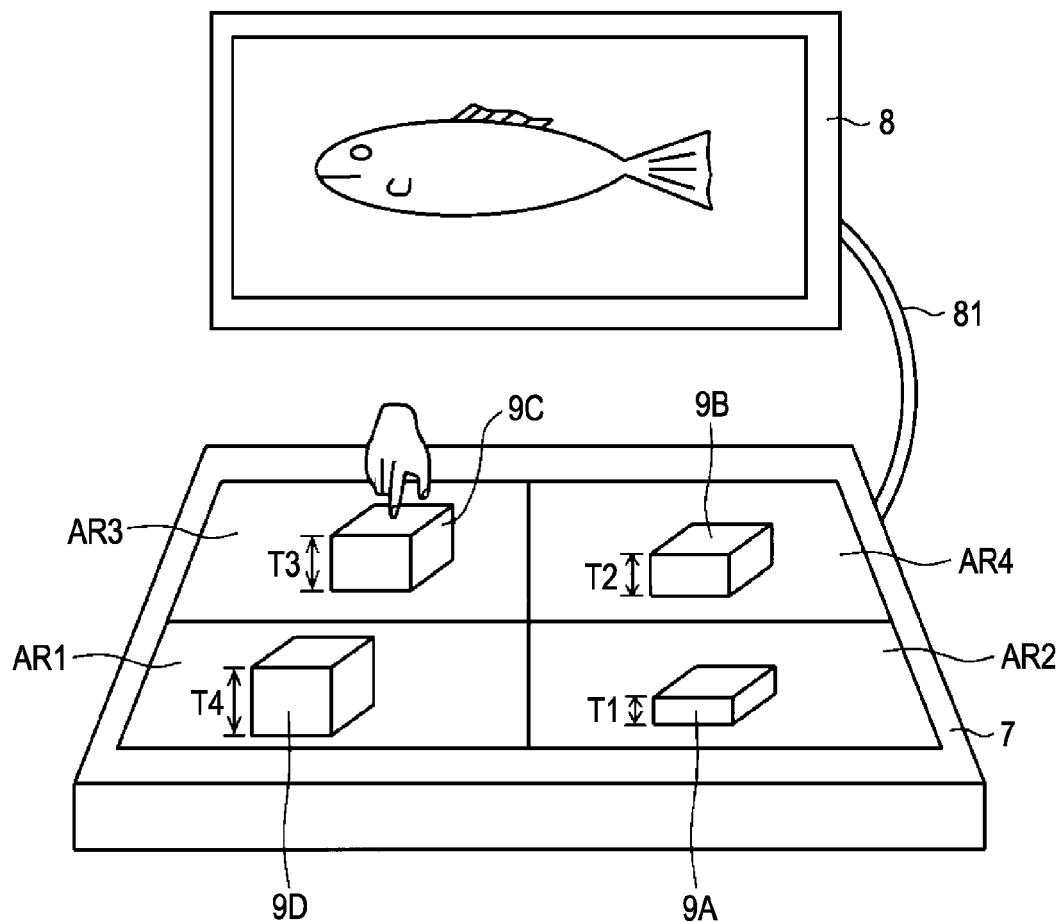
FIG. 14 illustrates a process of the information processing apparatus of the third embodiment of the present invention.

For example, if the operator touches the block 9C having a height of T3 placed within the third region AR3 as illustrated in FIG. 14, the CPU 71 references the region switch information storage 75 in order to read the memory address of the medium fish species. Using the read memory address, the CPU 71 reads an image of the medium fish species from the image memory 77, and supplies the image to the display 8. The display 8 displays the medium fish species.

The block 9C having a height T3 is replaced with another block in the third region AR3, and the operator touches the new block. The display 8 thus displays a fish species of another size.

If the switch-on of each of the switches A, B, C, and D is detected in accordance with the second embodiment, a plurality of images stored on the memory address area of a specified image memory are successively read and the display 8 displays on the screen thereof the images as in a slide show. If the switches A, B, C, and D are switched off (if the operator lets go of the block), the display 8 continuously displays the image at the moment the operator let go of the block.

Figure 15:
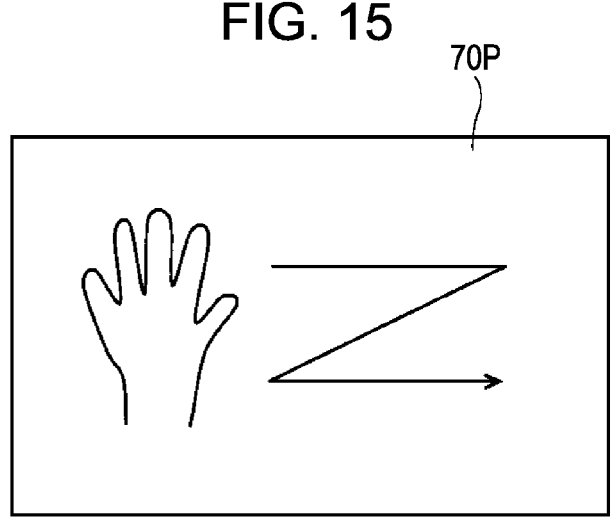
FIG. 15 illustrates a process of the information processing apparatus of the third embodiment of the present invention.

In accordance with the second embodiment, if the operator performs a predetermined gesture in the space above the sensor panel 70P, for example, swinging a hand horizontally as illustrated in FIG. 15, the information processing apparatus 7 interprets the gesture as an ending operation. More specifically, the CPU 71 monitors the sensor output from the sensor 70. Upon detecting the hand swinging operation in a horizontal direction, the CPU 71 determines the gesture as an ending operation.

Upon detecting the ending operation, the CPU 71 terminates the image displaying on the display 8.

Process of the Information Processing Apparatus of the Third Embodiment

Figure 16:
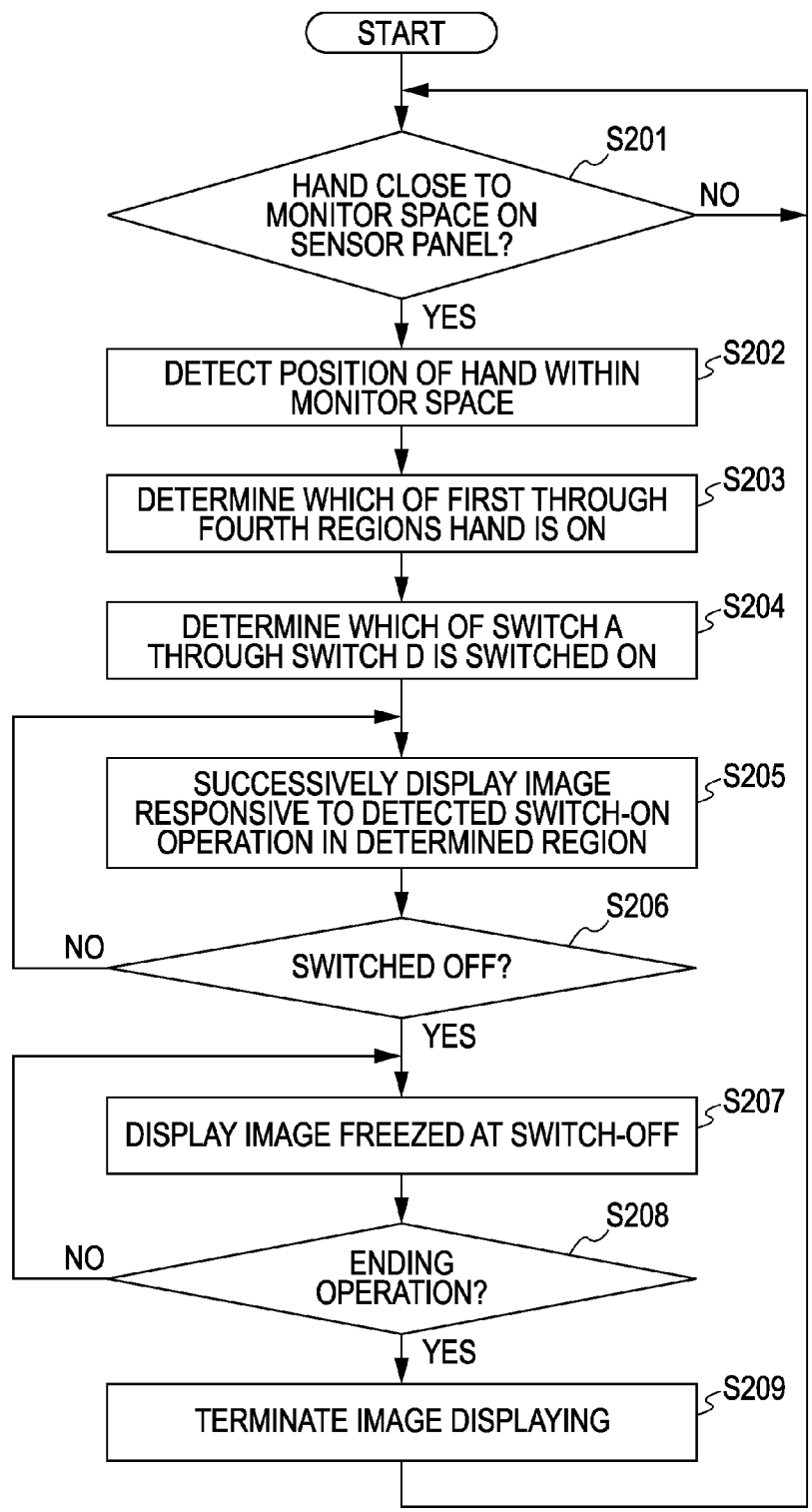
FIG. 16 is a flowchart illustrating the process of the information processing apparatus of the third embodiment of the present invention.

FIG. 16 is a flowchart of the process of the information processing apparatus 7 described above. The CPU 71 performs the process steps of the flowchart illustrated in FIG. 16 by executing the program on the ROM 72 with the RAM 73 as a working area.

The CPU 71 determines whether the hand of the operator gets close to the monitor space over the sensor panel 70P (step S201). If no hand proximity is detected, an operation in step S201 continues until the operator hand gets close to the monitor space.

If the CPU 71 determines in step S201 that the hand gets close to the monitor space over the sensor panel 70P, the CPU 71 detects the 3D coordinate position of the hand in the monitor space from the sensor output of the sensor 70 (step S202).

From the 3D coordinate position of the detected hand, the CPU 71 determines which of the first through fourth regions AR1-AR4 the hand is on (step S203).

The CPU 71 monitors the sensor output from the sensor 70 in order to detect a switch-on operation of any of the switches A-D (step S204). The detection process of the switch-on operation in step S204 will be described later.

The CPU 71 reads from the region switch information stored on the region switch information storage 75 image memory address information responsive to a combination of the region determined in step S203 and the switch with the switch-on operation thereof detected in step S204. Using the image memory address information, the CPU 71 successively reads from the image memory 77 the images in a slide-show format and supplies the read images to the display 8. The display 8 displays the images on the screen thereon (step S205).

The CPU 71 determines whether the switch is switched off with the operator's hand off the top surface of the block (step S206). If it is determined that the switch is not switched off, processing returns to step S205, and the images are successively displayed.

If it is determined in step S206 that the operator has switched off the switch, the CPU 71 keeps the image displayed at the moment of switching off and continuously reads the image at the switch-off timing from the image memory 77 (step S207).

The CPU 71 then monitors the sensor output from the sensor 70 in order to determine whether the gesture for the ending operation has been performed by the operator as illustrated in FIG. 15 (step S208). If it is determined in step S208 that the ending operation has not been performed by the operator, the CPU 71 returns to step S207 to repeat image displaying.

If it is determined in step S208 that the ending operation has been performed by the operator, the CPU 71 terminates image displaying on the display, and then returns to step S201. Step S201 and subsequent steps are repeated.

The image display control of the electronic picture book has been discussed for exemplary purposes only. Instead of the slide show, a list of animals or plants assigned to the first through fourth regions AR1-AR4 may be displayed. A variety of other display control methods is possible.

Figure 17:
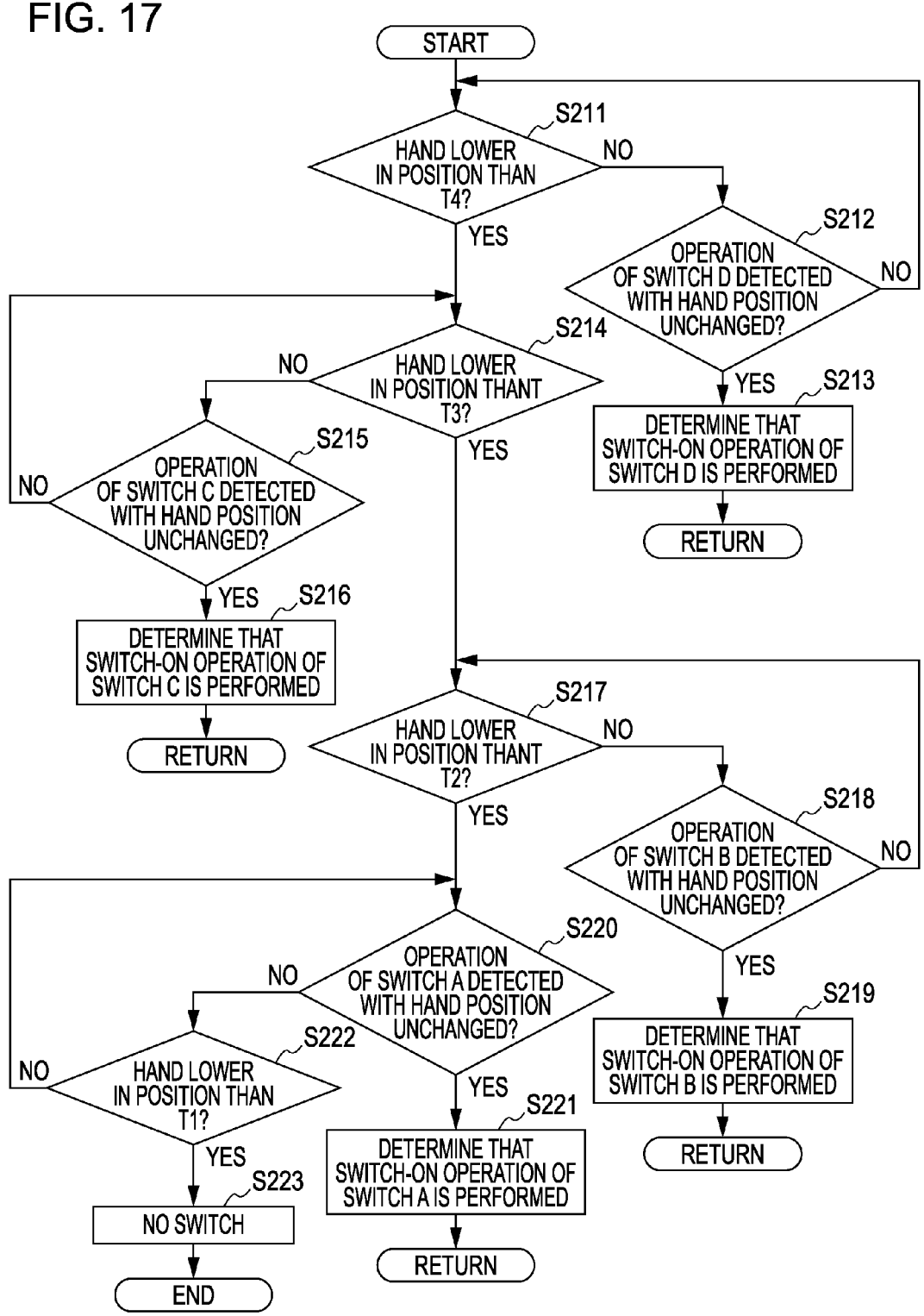
FIG. 17 is a flowchart of the process step in step S204 in the flowchart of FIG. 16.

The detection process of the switch-on operation in step S204 is described below with reference to a flowchart of FIG. 17.

The CPU 71 determines whether if the position of the hand is lower than the height T4 (step S211). If it is determined in step S211 that the hand is higher in position than the height T4, the CPU 71 compares the position of the hand with height T4' and then determines whether the hand is at the switch-on position of the switch D and whether the position of the hand remains unchanged (step S212).

If it is determined in step S212 that the hand is at the switch-on position of the switch D and that the position of the hand remains unchanged, the CPU 71 determines that the switch-on operation of the switch D has been detected (step S213). More specifically, if the operation target block is the block 9D, the hand position remains unchanged from the switch-on operation detection height T4' of the switch D. The CPU 71 thus detects the hand position as the switch-on of the switch D. The CPU 71 returns to the main routine of FIG. 16, and then performs step S205 and subsequent steps.

If it is determined in step S212 that the hand position is not at the switch-on operation position of the switch D, the CPU 71 returns to step S211.

If it is determined in step S211 that the hand position is lower than the height T4, the CPU 71 determines that a block shorter than the block 9D is an operation target. The CPU 71 then determines whether hand position is lower than the height T3 (step S214).

If it is determined in step S214 that the hand position is higher than the height T3, the CPU 71 compares the position of the hand with height T4' and then determines whether the hand is at the switch-on position of the switch C and whether the position of the hand remains unchanged (step S215).

If it is determined in step S215 that the hand is at the switch-on position of the switch C and that the position of the hand remains unchanged, the CPU 71 determines that the switch-on operation of the switch C has been detected (step S216). More specifically, if the operation target block is the block 9C, the hand position remains unchanged from the switch-on operation detection height T3' of the switch C. The CPU 71 thus detects the hand position as the switch-on of the switch C. The CPU 71 returns to the main routine of FIG. 16, and then performs step S205 and subsequent steps.

If it is determined in step S215 that the hand position is not at the switch-on operation position of the switch C, the CPU 71 returns to step S214.

If it is determined in step S214 that the hand position is lower than the height T3, the CPU 71 determines that a block shorter than the block 9C is an operation target. The CPU 71 then determines whether the hand position is lower than the height T2 (step S217).

If it is determined in step S217 that the hand position is higher than the height T2, the CPU 71 compares the position of the hand with height T2' and then determines whether the hand is at the switch-on position of the switch B and whether the position of the hand remains unchanged (step S218).

If it is determined in step S218 that the hand is at the switch-on position of the switch B and that the position of the hand remains unchanged, the CPU 71 determines that the switch-on operation of the switch B has been detected (step S219). More specifically, if the operation target block is the block 9B, the hand position remains unchanged from the switch-on operation detection height T2' of the switch B. The CPU 71 thus detects the hand position as the switch-on of the switch B. The CPU 71 returns to the main routine of FIG. 16, and then performs step S205 and subsequent steps.

If it is determined in step S218 that the hand position is not at the switch-on operation position of the switch B, the CPU 71 returns to step S217.

If it is determined in step S217 that the hand position is lower than the height T3, the CPU 71 determines that the block 9A shorter than the block 9B is an operation target. The CPU 71 compares the position of the hand with height T1' and then determines whether the hand is at the switch-on position of the switch A and whether the position of the hand remains unchanged (step S220).

If it is determined in step S220 that the hand is at the switch-on position of the switch A and that the position of the hand remains unchanged, the CPU 71 determines that the switch-on operation of the switch A has been detected (step S221). More specifically, if the operation target block is the block 9A, the hand position remains unchanged from the switch-on operation detection height T1' of the switch A. The CPU 71 thus detects the hand position as the switch-on of the switch A. The CPU 71 returns to the main routine of FIG. 16, and then performs step S205 and subsequent steps.

If it is determined in step S220 that the hand position is not at the switch-on operation position of the switch A, the CPU 71 determines whether the hand position is lower than the height T1 (step S222).

If it is determined in step S222 that the hand position is not lower than the height T1, the CPU 71 returns to step S220. If it is determined in step S222 that the hand position is lower than the height T1, the CPU 71 determines that the operation using any block is not performed. The CPU 71 then terminates this process routine and then returns to step S201 in the main routine.

Fourth Embodiment

Figure 18:
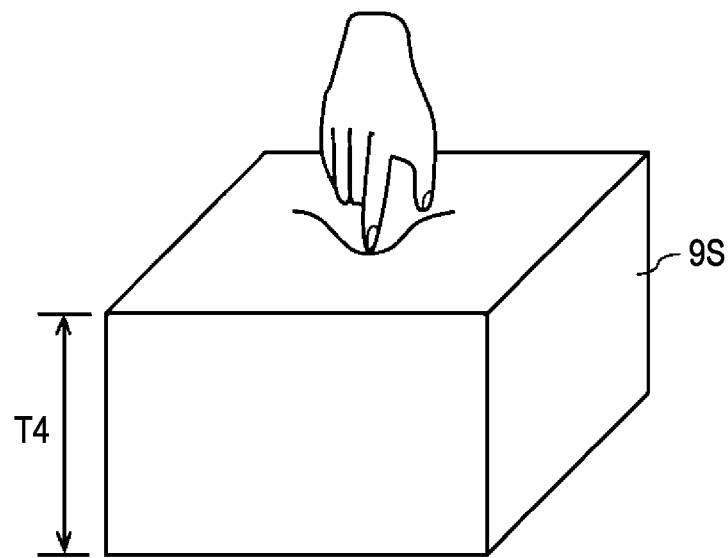
FIG. 18 illustrates an information processing apparatus of a fourth embodiment of the present invention.

A fourth embodiment of the present invention is a modification of the third embodiment of the present invention. In accordance with the third embodiment, the block hard and not elastic, such as a wooden block, is used for switch operation. In contrast, an elastically deformable block 9S (see FIG. 18), such as a sponge block, which is elastically deformable in response to a pressing force of the operator, is used for switch operation in accordance with the fourth embodiment.

In accordance with the fourth embodiment, a single elastically deformable block 9S is used to control the image displaying of an electronic picture book rather than using the plurality of blocks 9A-9D.

The information processing apparatus of the fourth embodiment remains unchanged in hardware structure from the information processing apparatus illustrated in FIG. 9. As will be described later, however, the display control process of the image information of the electronic picture book using the elastically deformable block 9S is different from the display control process of the third embodiment.

Figure 19:
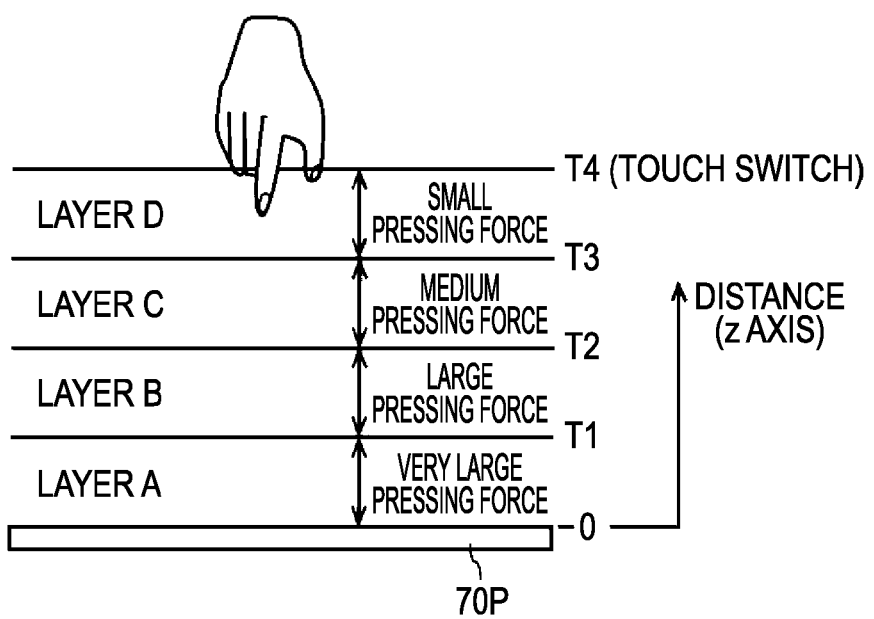
FIG. 19 illustrates the information processing apparatus of the fourth embodiment of the present invention.

The elastically deformable block 9S is a rectangular parallelepiped having a height of T4. In accordance with the fourth embodiment, a touch switch is assigned to the height T4 of the elastically deformable block 9S as illustrated in FIG. 19. More specifically, the switch-on of the touch switch is assigned to the touching on the elastically deformable block 9S (at a height of T4), and the switch-off of the touch switch is assigned to the detaching of the hand from the elastically deformable block 9S.

In accordance with the fourth embodiment, the operator can elastically deform the elastically deformable block 9S downward the sensor panel 70P. Four layers A-D are set depending on the spatial distance of the elastically deformable block 9S between the position at the height T4 and the plane of the sensor panel 70P.

Referring to FIG. 19, the plane of the sensor panel 70P is the origin point zero in the z axis, and the distances of the borders of the layers A-D in the z direction are set to be T1, T2, T3, and T4.

The ranges of the layers A-D are 0<layer A≤T1, T1<layer B≤T2, T2<layer C≤T3, and T3<layer D≤T4. The output information of the sensor 70 responsive to the border distances T1, T2, T3, and T4 of the layers is stored as threshold values of the layers A, B, C, and D onto the region switch information storage 75.

Referring to FIG. 19, the layers A-D respond to the pressing forces of the switching operation of the operator. More specifically, the layer A-D represent the degree of pressing forces acting on the elastically deformable block 9S.

FIG. 20 illustrates a storage content of the region switch information storage 75 in accordance with the fourth embodiment of the present invention.

As illustrated in FIG. 20, a height T' (slightly larger than a height T) is stored as a distance threshold of switch on and off of the touch switch. The distance ranges of the layers A-D are also stored.

In accordance with the fourth embodiment of the present invention, image information of the first regions AR1-AR4 is assigned to the layers A-D, respectively, instead of the switches A-D in the third embodiment.

Image Display Control Process of the Information Processing Apparatus of the Fourth Embodiment In accordance with the fourth embodiment, the displaying of the electronic picture book is controlled using a single switch and four layers.

Figure 21:
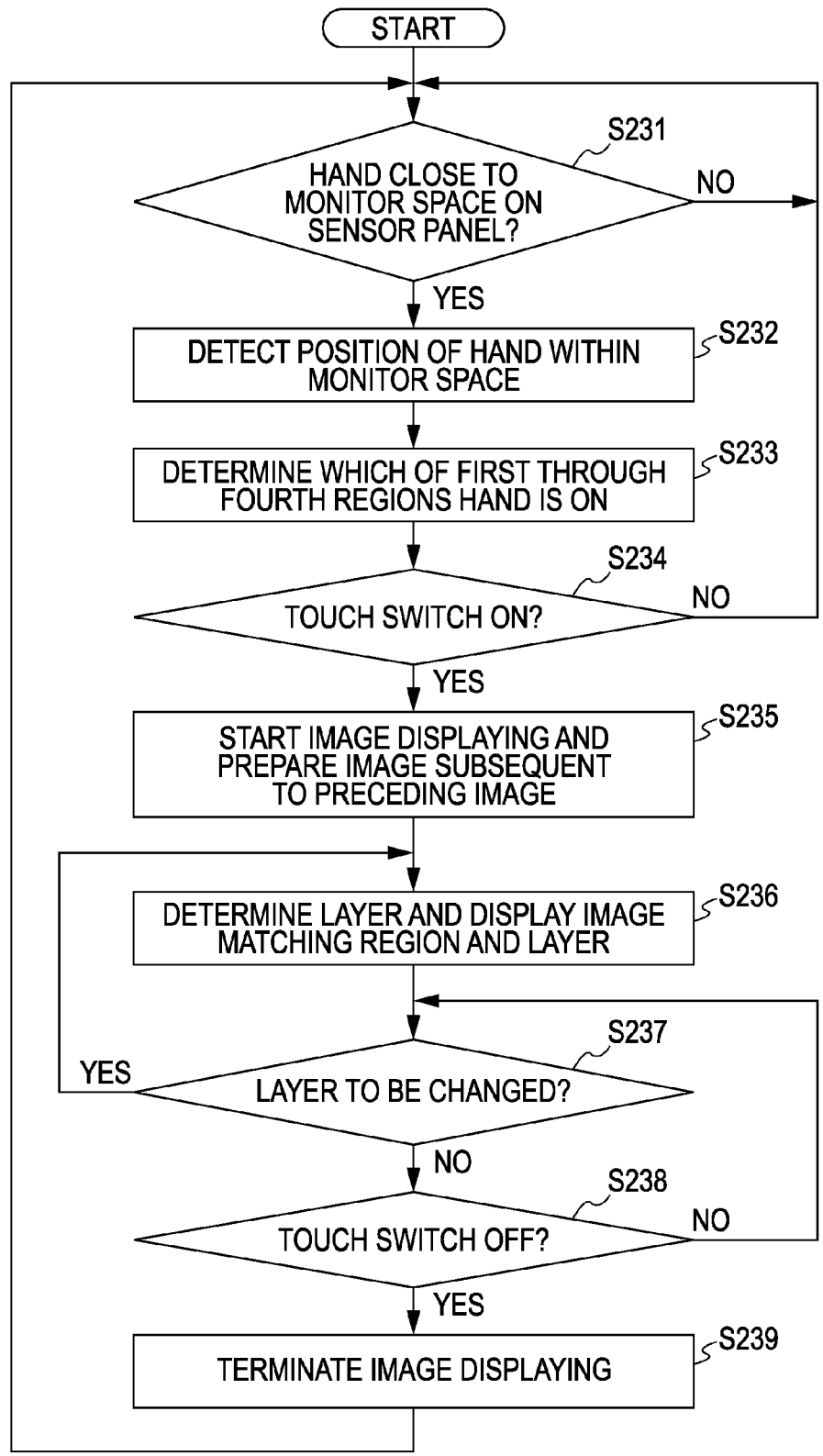
FIG. 21 is a flowchart illustrating a process of the information processing apparatus of the fourth embodiment of the present invention.

FIG. 21 is a flowchart of the image display control process of the fourth embodiment. In this case, as well, the CPU 71 of FIG. 9 performs the process steps in the flowchart of FIG. 21 by executing the program stored on the ROM 72 with the RAM 73 serving a working area.

The information processing apparatus of the third embodiment switches the images in a slide-show format in response to the operation of the switches A-D and then keeps any image displayed in response to a user operation. In accordance with the fourth embodiment, the display control is performed in a different manner.

The information processing apparatus starts image displaying of the electronic picture book in response to the switch-on operation of the touch switch and terminates the image displaying in response to the switch-off operation of the touch switch. Each time the touch switch is switched on, the image read from the first through fourth regions AR1-AR4 becomes different.

The CPU 71 first determines whether the hand gets close to the monitor space over the sensor panel 70P (step S231). If no hand proximity is detected, an operation in step S231 continues until the operator hand gets close to the monitor space.

If the CPU 71 determines in step S231 that the hand gets close to the monitor space over the sensor panel 70P, the CPU 71 detects the 3D coordinate position of the hand in the monitor space from the sensor output of the sensor 70 (step S232).

From the 3D coordinate position of the detected hand, the CPU 71 determines which of the first through fourth regions AR1-AR4 the hand is on (step S233).

The CPU 71 monitors the sensor output of the sensor in order to determine whether the hand has touched the elastically deformable block 9S, i.e., whether the touch switch has been switched on (step S234).

If it is determined in step S234 that the touch switch is not on, the CPU 71 returns to step S231 to repeat step S231 and subsequent steps.

If it is determined in step S234 that the touch switch is on, the CPU 71 determines that a start instruction to display the image of the electronic picture book has been issued. In accordance with fourth embodiment, the CPU 71 then prepares the images from the first through fourth regions AR1-AR4 as next images subsequent to the preceding image (step S235).

The CPU 71 identifies which of the layers A-D the hand is placed on. If it is determined that the touch switch is on, the CPU 71 determines that the layer is the layer D. The CPU 71 reads from the image memory 77 the image responsive to a combination of the identified layer and the region determined in step S233, and supplies the read image to the display 8. The display 8 then displays the image (step S236).

The CPU 71 then monitors the sensor output of the sensor 70 in order to determine whether a different layer is touched by the hand (step S238). If it is determined in step S238 that a different layer is touched, the CPU 71 returns to step S236. The CPU 71 reads the image responsive to the new layer from the image memory 77, and supplies the image to the display 8 to display thereon.

If it is determined in step S237 that the same layer is touched, the CPU 71 then determines whether the touch switch is off, i.e., whether the hand is off the elastically deformable block 9S and at a position higher than the height T4 (step S238).

If it is determined in step S238 that the touch switch is not off, the CPU 71 returns to step S237 to repeat step S237 and subsequent steps.

If it is determined in step S238 that the touch switch is off, the CPU 71 terminates image displaying (step S239), and returns to step S231. The CPU 71 then repeats step S231 and subsequent steps.

Fifth Embodiment

In the above-described embodiments, a space region occupied by the real object serves as the 3D set space region. The present invention is applicable even if no real body is not used as in a fifth embodiment. In accordance with the fifth embodiment, the operator virtually touches a 3D image projected onto a space such as a hologram image.

Figure 22:
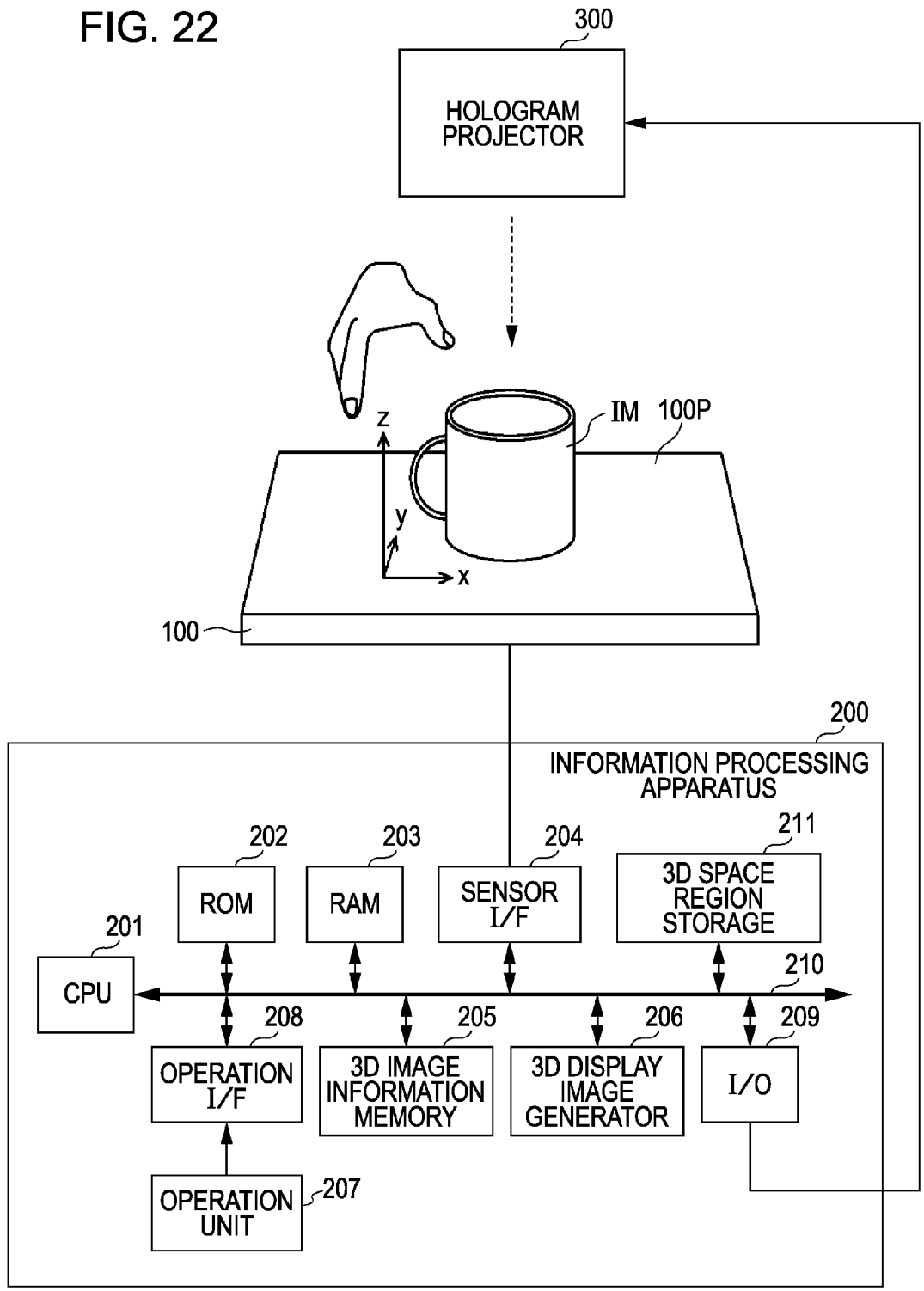
FIG. 22 is a block diagram illustrating an information processing system in accordance with a fifth embodiment the present invention.

FIG. 22 is a block diagram illustrating an information processing system of the fifth embodiment of the present invention. The information processing system of the fifth embodiment includes a sensor device 100, an image processing apparatus 200, and a hologram projector 300.

The sensor device 100 is identical in structure to the sensor 1 of the first embodiment. The sensor device 100 includes a sensor panel 100P identical in structure to the sensor panel 10 of the sensor 1. The sensor output of the sensor device 100 is supplied to the image processing apparatus 200.

A 3D projection image IM projected by the hologram projector 300 is virtually displayed on the monitor space over the sensor panel 100P of the sensor device 100. Referring to FIG. 22, a cup is displayed as an example of the 3D projection image IM in the monitor space over the sensor panel 100P.

The image processing apparatus 200 including a personal computer detects the 3D coordinate position of the detection target such as the hand or finger of the operator in the monitor space over the sensor panel 100P from the sensor output from the sensor device 100.

The image processing apparatus 200 also generates a 3D image and supplies the generated 3D image to the hologram projector 300. Using image information of the received 3D image, the hologram projector 300 projects and displays the 3D image in the monitor space over the sensor panel 100P.

In accordance with the fourth embodiment, the image processing apparatus 200 can modify the position of the 3D projection image IM within the monitor space, projected and displayed in the monitor space over the sensor panel 100P, in response to the instruction operation of the operator. The image processing apparatus 200 can modify the 3D projected and displayed image IM into a variety of 3D images in response to the instruction operation of the operator.

In accordance with the fifth embodiment, the image processing apparatus 200 reflects the 3D space position of the hand or finger of the operator detected in the monitor space over the sensor panel 100P in the projected and displayed 3D projection image IM.

More specifically, the image processing apparatus 200 of the fifth embodiment stores, as the 3D set space region, coordinate information of the 3D region occupied by the 3D projection image IM in the monitor space over the sensor panel 100P. The image processing apparatus 200 monitors the sensor output of the sensor device 100 in order to determine whether the position of the hand or finger is contained within the 3D set space region. The image processing apparatus 200 determines whether the hand or finger touches the external surface of the 3D projection image IM.

If it is determined that the hand or finger virtually touches the external surface of the 3D projection image IM, the image processing apparatus 200 displays in the 3D projection image IM the 3D coordinate position with a red or yellow highlight mark attached for notification.

The image processing apparatus 200 has a structure as illustrated in FIG. 22 to perform the above-described functions.

The image processing apparatus 200 includes a CPU 201, a ROM 202 storing a program, and a RAM 203 serving as a working area, with these elements mutually connected via a system bus 210.

The system bus 210 is connected to the sensor device 100 via a sensor interface 204. The system bus 210 also connects to a 3D image information memory 205, a 3D display image generator 206, an operation interface 208 connected to an operation unit 207, and an input/output port 209 supplying 3D image information to the hologram projector 300.

The 3D display image generator 206 may be implemented using hardware. Optionally, the 3D display image generator 206 may be implemented as a software function of the CPU 201.

A 3D space region information storage 211 is connected to the system bus 210. The 3D space region information storage 211 includes a storage memory, and the 3D space region information generation function thereof excluding memory function may be implemented as a software function of the CPU 201.

The operator selects a 3D image to be displayed using the operation unit 207 on the image processing apparatus 200, and instructs the image processing apparatus 200 to display the 3D image. The image information of the 3D image selected by the operator is read from the 3D image information memory 205 and supplied to the 3D display image generator 206.

In response to an alignment instruction of the 3D image given by the operator on the operation unit 207, the 3D display image generator 206 generates from the 3D image information from the 3D image information memory 205 the image information of the 3D image to be displayed.

The 3D display image generator 206 supplies to a 3D space region information storage 211 the 3D coordinate information (representing the image outline of the 3D image) of the image information of the generated 3D display image.

Based on the 3D coordinate information acquired from the 3D display image generator 206, the 3D space region information storage 211 generates coordinate information of the 3D set space region corresponding to the 3D projection image IM in the monitor space over the sensor panel 100P, and then stores the coordinate information on the storage memory thereof. The generated coordinate information of the 3D set space region correspond to the coordinates of the external surface of the projected and displayed 3D projection image IM.

The operator may modify the display position of or looking angle to the 3D projection image IM in the monitor space over the sensor panel 100P using the operation unit 207. In response to the modification instruction, the 3D space region information storage 211 modifies the coordinate information of the 3D set space region.

When the operator changes the 3D projection image IM using the operation unit 207, the 3D space region information storage 211 re-generates the coordinate information of the 3D set space region in the same manner as described above, and stores the re-generated coordinate information onto the storage memory thereof.

The CPU 201 monitors the sensor output of the sensor device 100, thereby detecting the hand or finger of the operator. The CPU 201 then compares the 3D coordinate position of the detected hand or finger with the coordinate information of the 3D set space region stored on the 3D space region information storage 211 in order to determine whether the hand or finger touches the external surface of the 3D projection image IM.

If it is determined that the hand or finger virtually touches the external surface of the 3D projection image IM, the CPU 201 notifies the 3D display image generator 206 of the 3D coordinate position. In response to the received 3D coordinate position, the 3D display image generator 206 generates image information of the 3D display image with the corresponding point on the 3D projection image IM with a red or yellow highlight mark attached, and then outputs the image information of the 3D display image. The image information of the 3D display image is then supplied to the hologram projector 300 via the input/output port 209. The 3D projection image IM with the highlight mark attached is then projected and displayed in the monitor space over the sensor panel 100P.

Flowchart of the Process of the Image Processing Apparatus 200

Figure 23:
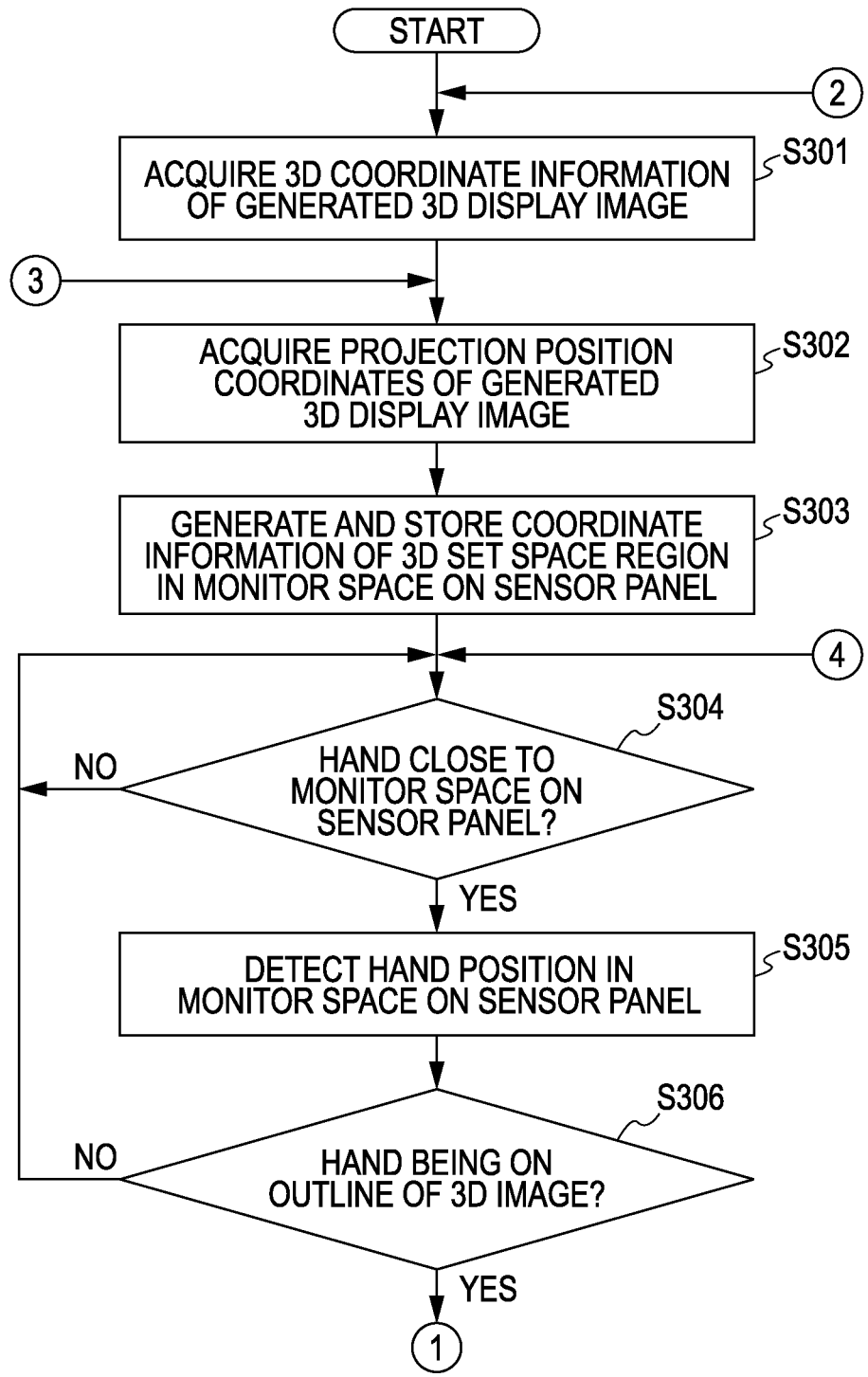
FIG. 23 is a flowchart illustrating a process of the information processing system of the fifth embodiment of the present invention.
Figure 24:
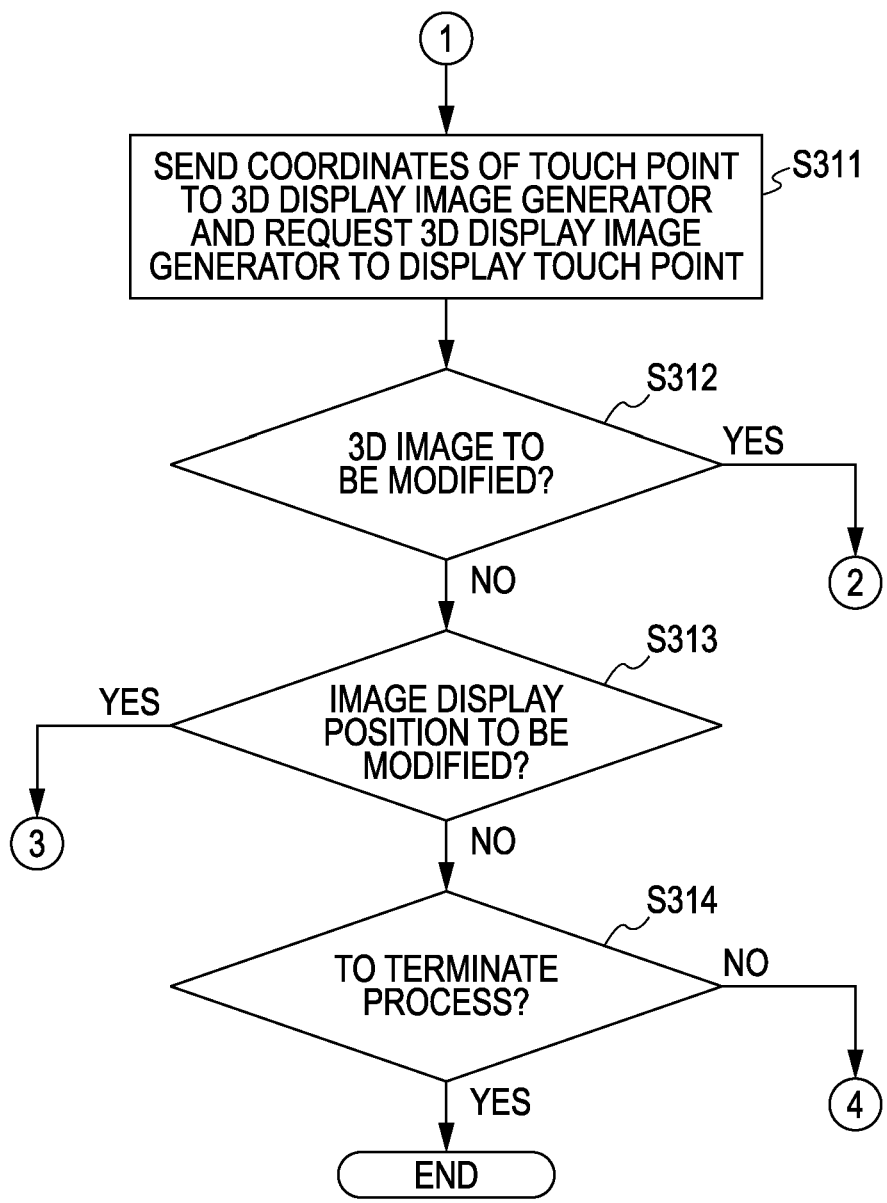
FIG. 24 is a continuation of the flowchart of FIG. 23.

FIGS. 23 and 24 are a flowchart of the process of the CPU 201 including a 3D set space region generation process.

The CPU 201 acquires 3D coordinate information of a 3D image generated by the 3D display image generator 206 (step S301). The CPU 201 then acquires position coordinates of the 3D projection image IM of the generated 3D display image in the monitor space over the sensor panel 100P (step S302). The process step in S302 is to acquire information that is input in a setting operation of a display position in the monitor space over the sensor device 100. The setting operation is performed by the operator using the operation unit 207.

The CPU 201 generates from the information acquired in step S301 and step S302 the coordinate information of the 3D set space region corresponding to the space region occupied by the 3D projection image IM in the monitor space over the sensor panel 100P, and then stores the coordinate information onto the storage memory thereof (step S303).

The process steps in steps S301-S303 are the 3D set space region generation process of the 3D space region information storage 211.

The CPU 201 determines whether the hand of the operator gets close to the monitor space over the sensor panel 100P

(step S304). If no hand proximity is detected, an operation in step S304 continues until the operator hand gets close to the monitor space.

If the CPU 201 determines in step S304 that the hand gets close to the monitor space over the sensor panel 100P, the CPU 201 detects the 3D coordinate position of the hand in the monitor space from the sensor output of the sensor 70 (step S305).

The CPU 201 monitors the sensor output of the sensor 100 and determines whether the coordinate position of the hand is contained in the 3D set space region in order to determine the hand has touched the outline of the 3D projection image IM (step S306).

If it is determined in step S306 that the hand has not touched the outline of the 3D projection image IM, the CPU 201 returns to step S304 to repeat step S304 and subsequent steps.

If it is determined in step S306 that the hand has touched the outline of the 3D projection image IM, the CPU 201 supplies the 3D coordinates (3D coordinates of the hand) of a touch point to the 3D display image generator 206 and requests the 3D display image generator 206 to display the touch point (step S311 of FIG. 24).

Upon receiving the information of the 3D coordinates of the touch point, the 3D display image generator 206 generates the image information of a 3D display image with a red or yellow highlight mark attached at the touch point as previously described, and then supplies the resulting image information to the hologram projector 300.

Figure 25:
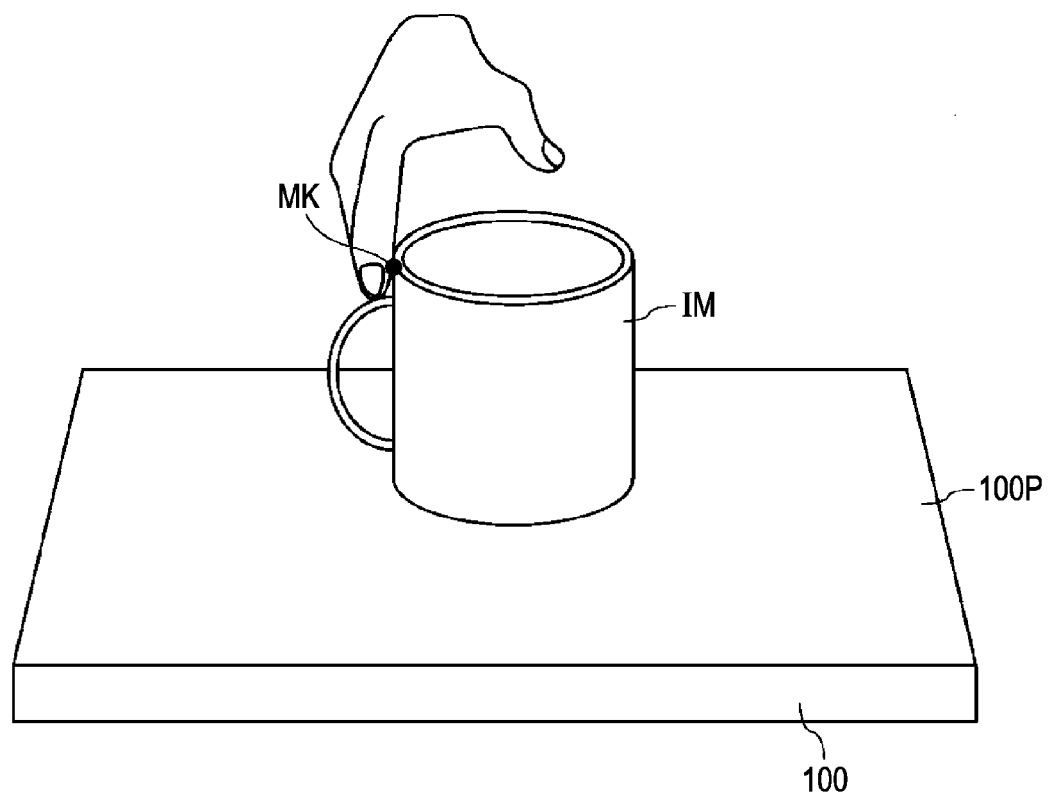
FIG. 25 illustrates a process of the information processing apparatus of the fifth embodiment of the present invention.

The hologram projector 300 then displays the 3D projection image IM, based on the 3D display image information, with a highlight mark MK attached thereon as illustrated in FIG. 25.

The CPU 201 then determines whether the operator has issued an image modification instruction to modify the 3D image to be displayed, such as a rotation instruction (step S312). If it is determined in step S312 that the image modification instruction to modify the 3D image to be displayed has been issued, the CPU 201 returns to step S301 to repeat step S301 and subsequent steps.

If it is determined in step S312 that that no image modification instruction to modify the 3D image to be displayed has been issued, the CPU 201 determines whether a display position modification instruction to modify the display position of the 3D image within the monitor space has been issued (step S313).

If it is determined in step S313 that a display position modification instruction has been issued, the CPU 201 returns to step S302 to repeat step S302 and subsequent steps.

If it is determined in step S313 that no display position modification instruction has been issued, the CPU 201 determines whether an ending instruction to terminate image displaying has been received via the operation unit 207 (step S314).

If it is determined in step S314 that no ending instruction has been received, the CPU 201 returns to step S304 to repeat step S304 and subsequent steps. If it is determined in step S314 that an ending instruction has been received, the CPU 201 terminates this process routine.

In accordance with the fifth embodiment of the present invention, the 3D image projected and displayed in the monitor space over the sensor panel 100P is presented with the highlight mark MK attached thereto. Such a presentation looks as if the operator has really touched the 3D image.

Instead of or in addition to the highlight mark MK, a buzzer sound may be emitted at the timing when the operator virtually touches the outline of the 3D projection image IM.

In accordance with the fifth embodiment, the touching of the hand of the operator on the 3D projection image IM is indicated by the displaying of the touch point and/or the emitting of sound. Optionally, the 3D projection image IM may be moved or deformed in response to the movement of the hand of the operator.

For example, the hand of the operator may move further inwardly into the 3D projection image IM from the touch point on the outline of the 3D projection image IM. The image processing apparatus 200 determines that the 3D projection image IM is pushed if the 3D projection image IM represents an image of a solid object. The image processing apparatus 200 then modifies the 3D display image in a manner such that the 3D display image moves in translation in the monitor space over the sensor panel 100P in response to the displacement of the hand of the operator detected from the sensor output from the sensor device 100.

In the case of the 3D projection image IM representing an elastically deformable object, the hand of the operator may also move further inwardly into the 3D projection image IM from the touch point on the outline of the 3D projection image IM. The image processing apparatus 200 then determines that the operator has elastically deformed the 3D projection image IM. The image processing apparatus 200 then modifies the 3D projection image IM in a manner such that the 3D projection image IM is elastically deformed in response to the displacement of the hand of the operator detected from the sensor output from the sensor device 100.

Alternate Embodiments and Modifications

In accordance with the above-described embodiments, the sensor means converts the capacitance responsive to the spatial distance of the detection target into the oscillation frequency, and the oscillation frequency is counted by the frequency counter. The counted frequency is then output. The technique of obtaining the sensor output responsive to the capacitance is not limited to this method. For example, a frequency-voltage converter may be used to obtain as the sensor output an output voltage responsive to the oscillation frequency.

A charge transfer method may be used. With the charge transfer method, a capacitance responsive to a spatial distance of a detection target is converted into a voltage. A projected capacitor method may also be used. With the projected capacitor method, a capacitance responsive to a spatial distance of a detection target is obtained.

In accordance with the above-described embodiments, the electrode of the sensor means is a wire electrode. A dot electrode may be arranged at an intersection of a horizontal wire electrode and a vertical wire electrode. In such a case, a capacitance between each dot electrode and the ground is detected. The capacitance is detected on each of a plurality of electrodes with the horizontal wires and the vertical wires successively switched. In order to maintain detection sensitivity at a proper level on detection distance, the detection electrodes are selected in a decimation fashion in accordance with the detection distance in the same manner as in the wire electrode.

In accordance with the above-described embodiments, the sensor means detects the spatial distance of the detection target according to capacitance. The present invention is not limited to this method. Any type of sensor means may be used as long as the sensor means detects the spatial distance of the detection target.

It should be understood by those skilled in the art that various modifications, combinations, sub-combinations and alterations may occur depending on design requirements and other factors insofar as they are within the scope of the appended claims or the equivalents thereof.

What is claimed is:

1. A method of processing information comprising:
generating a sensor output signal responsive to the three-dimensional coordinate position of a detection target in a monitor space, and outputting the sensor output signal;
detecting the three-dimensional coordinate position of the detection target in the monitor space from the sensor output signal;
determining whether the three-dimensional coordinate position of the detection target in the monitor space is contained in a three-dimensional space region, based on the three-dimensional position of the detection target and stored coordinate information, wherein the three-dimensional space region is placed within the monitor space, the three-dimensional space region is set in accordance with the external surface of a three-dimensional physical object, and the stored coordinate information is indicative of the boundary of the physical object within the monitor space;
outputting the determination results obtained in the determining step; and
determining whether the three-dimensional object is under the pressing force of the detection target in response to a distance of the three-dimensional coordinate position of the detection target within the three-dimensional space region from a border of the three-dimension space region, determining the intensity of the pressing force responsive to the distance from the border, and outputting an output signal responsive to a difference in the pressing force.

2. The method according to claim 1, wherein the sensor output signal is generated in response to the three-dimensional coordinate position of the detection target in the monitor space from a capacitance between two electrodes out of a plurality of electrodes, the monitor space being a space over a plane containing the plurality of electrodes.

3. The method according to claim 1, wherein outputting an output signal responsive to a difference in the pressing force comprises providing a switching output as to whether the detection target has touched the external surface of the three-dimensional object.

4. The method according to claim 1, further comprising projecting a three-dimensional image onto the monitor space,
wherein the three-dimensional space region is set in accordance with the three-dimensional image, and
wherein it is determined whether or not the detection target has touched a virtual external surface of the three-dimensional image.

5. The method according to claim 4, further comprising giving a touch alert in response to receiving an output indicating that the detection target has touched the virtual external surface of the three-dimensional image.

6. The method according to claim 5, wherein giving a touch alert comprises:
generating image information of the three-dimensional image to be projected onto the monitor space and supplying the image information to a projector; and
adding to the three-dimensional image a marking representing a touch position on the virtual external surface when the output indicating that the detection target has touched the virtual external surface of the three-dimensional image is received.

7. The method according to claim 5, further comprising emitting a sound in response to receiving the output indicating that the detection target has touched the virtual external surface of the three-dimensional image.

8. The method according to claim 4, further comprising:
generating image information of the three-dimensional image to be projected onto the monitor space and supplying the image information to a projector;
generating three-dimensional coordinate information identifying the three-dimensional space region in the monitor space from the three-dimensional coordinate information of the three-dimensional image, and storing the generated three-dimensional coordinate information; and
in response to a change in the three-dimensional image, re-generating the three-dimensional coordinate information identifying the three-dimensional space region from the three-dimensional coordinate information of the three-dimensional image.

* * * * *